US009073179B2

(12) United States Patent
Welygan et al.

(10) Patent No.: US 9,073,179 B2
(45) Date of Patent: Jul. 7, 2015

(54) LASER METHOD FOR MAKING SHAPED CERAMIC ABRASIVE PARTICLES, SHAPED CERAMIC ABRASIVE PARTICLES, AND ABRASIVE ARTICLES

(75) Inventors: Dennis G. Welygan, Woodbury, MN (US); Charles J. Studiner, IV, Cottage Grove, MN (US); Dwight D. Erickson, Woodbury, MN (US); Edward J. Woo, Woodbury, MN (US); Pingfan Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/881,601

(22) PCT Filed: Oct. 21, 2011

(86) PCT No.: PCT/US2011/057203
§ 371 (c)(1),
(2), (4) Date: Apr. 25, 2013

(87) PCT Pub. No.: WO2012/061033
PCT Pub. Date: May 10, 2012

(65) Prior Publication Data
US 2013/0212952 A1    Aug. 22, 2013

Related U.S. Application Data

(60) Provisional application No. 61/548,941, filed on Oct. 19, 2011, provisional application No. 61/408,813, filed on Nov. 1, 2010.

(51) Int. Cl.
*B24D 3/00*    (2006.01)
*B24D 11/00*   (2006.01)
(Continued)

(52) U.S. Cl.
CPC .............. *B24D 18/00* (2013.01); *C09K 3/1409* (2013.01); *C09K 3/1418* (2013.01); *B23K 26/38* (2013.01);
(Continued)

(58) Field of Classification Search
USPC ............................................ 51/309, 293, 307
See application file for complete search history.

(56) References Cited

U.S. PATENT DOCUMENTS 1,910,444 A    5/1933   Nicholson
2,958,593 A   11/1960   Hoover et al.
(Continued)

FOREIGN PATENT DOCUMENTS

CA       743715      10/1966
CN       2143134 Y   10/1993
(Continued)

OTHER PUBLICATIONS

Saint-Gobain Staff, "Investigation of Shaped Abrasive Particles vol. 1: Review of US Pat. No. 6054093 Apr. 25, 2000", Apr. 2011, published on the worldwide web at www.abrasivernaterials.saint-gobain.com.
(Continued)

*Primary Examiner* — James McDonough
(74) *Attorney, Agent, or Firm* — Bradford B. Wright

(57) ABSTRACT

A method of making shaped ceramic abrasive particles includes cutting a layer of ceramic precursor material using a laser beam and forming shaped ceramic precursor particles. Further thermal processing provides shaped ceramic abrasive particles. Shaped ceramic abrasive particles producible by the methods and abrasive articles containing them are also disclosed.

12 Claims, 12 Drawing Sheets

(51) Int. Cl.
| | |
|---|---|
| *B24D 18/00* | (2006.01) |
| *B24D 3/02* | (2006.01) |
| *C09K 3/14* | (2006.01) |
| *C09C 1/68* | (2006.01) |
| *B23K 26/38* | (2014.01) |
| *B23K 26/40* | (2014.01) |
| *C04B 35/111* | (2006.01) |
| *B23K 26/06* | (2014.01) |
| *B23K 26/08* | (2014.01) |

(52) U.S. Cl.
CPC .......... *B23K 26/408* (2013.01); *C04B 35/1115* (2013.01); *C04B 2235/52* (2013.01); *C04B 2235/6025* (2013.01); *C04B 2235/612* (2013.01); *C04B 2235/94* (2013.01); *B23K 26/0635* (2013.01); *B23K 26/0807* (2013.01); *B23K 26/0815* (2013.01); *B23K 26/0838* (2013.01); *B23K 26/0846* (2013.01)

(56) References Cited

U.S. PATENT DOCUMENTS

| | | | |
|---|---|---|---|
| 3,041,156 A | 6/1962 | Rowse et al. | |
| 4,018,575 A | 4/1977 | Davis et al. | |
| 4,156,626 A | 5/1979 | Souder | |
| 4,227,350 A | 10/1980 | Fitzer | |
| 4,314,827 A | 2/1982 | Leitheiser | |
| 4,331,453 A | 5/1982 | Dau et al. | |
| 4,417,124 A | 11/1983 | Benedite et al. | |
| 4,481,016 A | 11/1984 | Campbell et al. | |
| 4,609,380 A | 9/1986 | Barnett | |
| 4,652,275 A | 3/1987 | Bloecher et al. | |
| 4,734,104 A | 3/1988 | Broberg | |
| 4,744,802 A | 5/1988 | Schwabel et al. | |
| 4,751,137 A | 6/1988 | Halg et al. | |
| 4,800,685 A | 1/1989 | Haynes | |
| 4,898,597 A | 2/1990 | Hay et al. | |
| 4,933,373 A | 6/1990 | Moren | |
| 4,940,675 A | 7/1990 | Bohlayer et al. | |
| 4,991,362 A | 2/1991 | Heyer et al. | |
| 4,994,058 A | 2/1991 | Raven et al. | |
| 4,997,461 A | 3/1991 | Markhoff et al. | |
| 5,009,675 A | 4/1991 | Kunz et al. | |
| 5,011,508 A | 4/1991 | Wald et al. | |
| 5,042,991 A | 8/1991 | Kunz et al. | |
| 5,085,671 A | 2/1992 | Martin et al. | |
| 5,090,968 A | 2/1992 | Pellow | |
| 5,137,542 A | 8/1992 | Buchanan | |
| 5,152,917 A | 10/1992 | Pieper et al. | |
| 5,164,348 A | 11/1992 | Wood | |
| 5,213,591 A | 5/1993 | Celikkaya et al. | |
| 5,282,875 A * | 2/1994 | Wood et al. | 51/298 |
| 5,366,523 A | 11/1994 | Rowenhorst et al. | |
| 5,372,620 A | 12/1994 | Rowse | |
| 5,417,726 A | 5/1995 | Stout et al. | |
| 5,431,967 A | 7/1995 | Manthiram et al. | |
| 5,551,963 A | 9/1996 | Larmie | |
| 5,554,068 A | 9/1996 | Carr et al. | |
| 5,573,619 A | 11/1996 | Benedict et al. | |
| 5,591,239 A | 1/1997 | Larson et al. | |
| 5,645,619 A | 7/1997 | Erickson et al. | |
| 5,681,361 A | 10/1997 | Sanders | |
| 5,712,210 A | 1/1998 | Windisch et al. | |
| 5,713,893 A | 2/1998 | O'Donnell, Jr. | |
| 5,738,697 A | 4/1998 | Wu et al. | |
| 5,770,126 A | 6/1998 | Singh et al. | |
| 5,858,140 A | 1/1999 | Berger et al. | |
| 5,928,070 A | 7/1999 | Lux | |
| 5,942,015 A | 8/1999 | Culler et al. | |
| 5,984,958 A | 11/1999 | Girard | |
| 6,017,831 A | 1/2000 | Beardsley et al. | |
| 6,054,093 A | 4/2000 | Torre, Jr. et al. | |
| 6,063,323 A * | 5/2000 | Fuls et al. | 264/432 |
| 6,207,246 B1 | 3/2001 | Moren et al. | |
| 6,228,134 B1 | 5/2001 | Erickson | |
| 6,261,682 B1 | 7/2001 | Law | |
| 6,277,161 B1 * | 8/2001 | Castro et al. | 51/309 |
| 6,302,930 B1 | 10/2001 | Lux | |
| 6,410,173 B1 | 6/2002 | Arfsten et al. | |
| 6,531,191 B1 | 3/2003 | Notenboom | |
| 6,757,455 B1 | 6/2004 | Kamijima et al. | |
| 8,034,137 B2 * | 10/2011 | Erickson et al. | 51/309 |
| 8,123,828 B2 | 2/2012 | Culler et al. | |
| 8,142,531 B2 | 3/2012 | Adefris et al. | |
| 8,142,532 B2 | 3/2012 | Erickson et al. | |
| 8,142,891 B2 | 3/2012 | Culler et al. | |
| 8,551,577 B2 | 10/2013 | Moren et al. | |
| 2003/0228738 A1 | 12/2003 | Beaudoin | |
| 2004/0148967 A1 | 8/2004 | Celikkaya et al. | |
| 2005/0169331 A1 | 8/2005 | Vahala | |
| 2005/0227590 A1 | 10/2005 | Sung | |
| 2006/0048704 A1 | 3/2006 | Welygan et al. | |
| 2006/0113286 A1 | 6/2006 | Furui | |
| 2006/0201390 A1 | 9/2006 | Lahann et al. | |
| 2007/0062921 A1 | 3/2007 | Karube et al. | |
| 2007/0158317 A1 | 7/2007 | Brix et al. | |
| 2007/0224359 A1 | 9/2007 | Burin et al. | |
| 2010/0056024 A1 | 3/2010 | Joseph et al. | |
| 2010/0059360 A1 | 3/2010 | Wendling | |
| 2010/0146867 A1 | 6/2010 | Boden et al. | |
| 2010/0151195 A1 | 6/2010 | Culler et al. | |
| 2010/0151196 A1 | 6/2010 | Adefris et al. | |
| 2010/0151201 A1 | 6/2010 | Erickson et al. | |
| 2010/0319269 A1 | 12/2010 | Erickson | |
| 2011/0289854 A1 | 12/2011 | Moren et al. | |
| 2012/0122383 A1 | 5/2012 | Woo et al. | |
| 2012/0227333 A1 | 9/2012 | Adefris et al. | |
| 2012/0231711 A1 | 9/2012 | Keipert et al. | |
| 2013/0125477 A1 | 5/2013 | Adefris | |

FOREIGN PATENT DOCUMENTS

| | | |
|---|---|---|
| EP | 0 390 397 | 10/1990 |
| GB | 986847 | 3/1965 |
| JP | 7-140305 | 6/1995 |
| JP | 2003-211422 | 7/2003 |
| WO | WO 01/46298 | 1/2001 |
| WO | WO 2004/101225 | 11/2004 |
| WO | WO 2010/059835 | 5/2010 |
| WO | WO 2011/017022 | 2/2011 |
| WO | WO 2011/068714 | 6/2011 |
| WO | WO 2011/068724 | 6/2011 |
| WO | WO 2011/087649 | 7/2011 |
| WO | WO 2011/109188 | 9/2011 |
| WO | WO 2012/018903 | 2/2012 |
| WO | WO 2012/061016 | 5/2012 |
| WO | WO 2012/141905 | 10/2012 |
| WO | WO 2013/009484 | 6/2013 |

OTHER PUBLICATIONS

International Search Report, PCT/US2011/057203, mailed Jun. 28, 2012, 5 pages.
European Extended Search Report, EP11838458.5, dated Mar. 27, 2014, 4 pages.

* cited by examiner

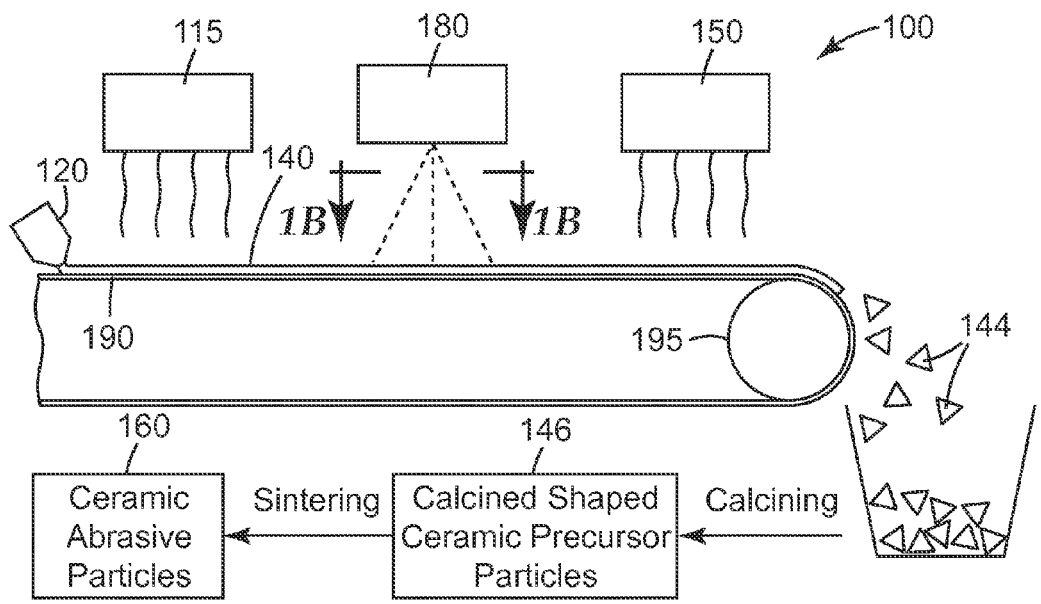
FIG. 1A
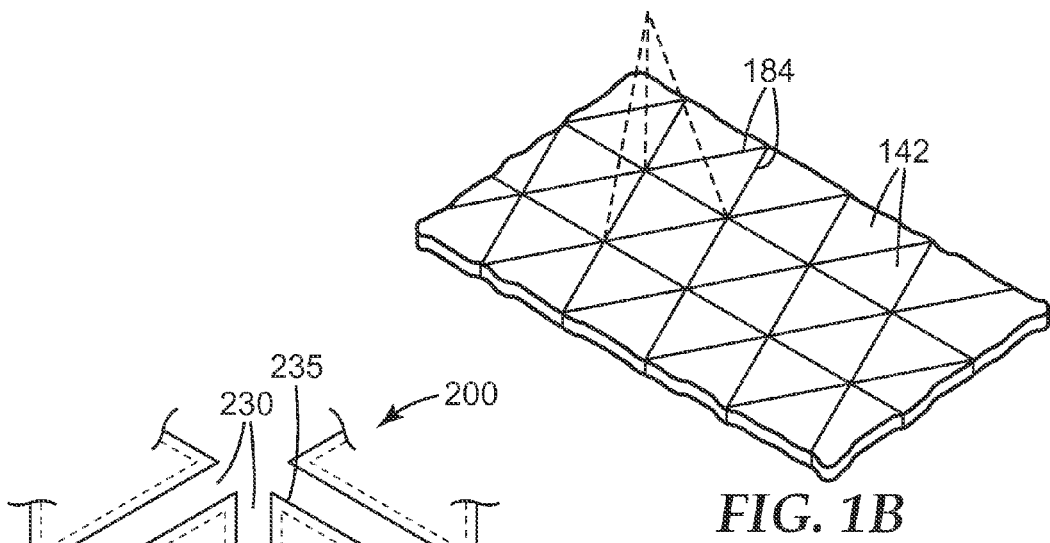
FIG. 1B
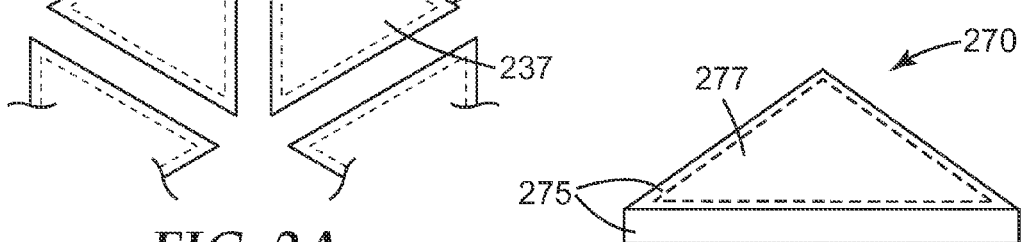
FIG. 2A
FIG. 2B

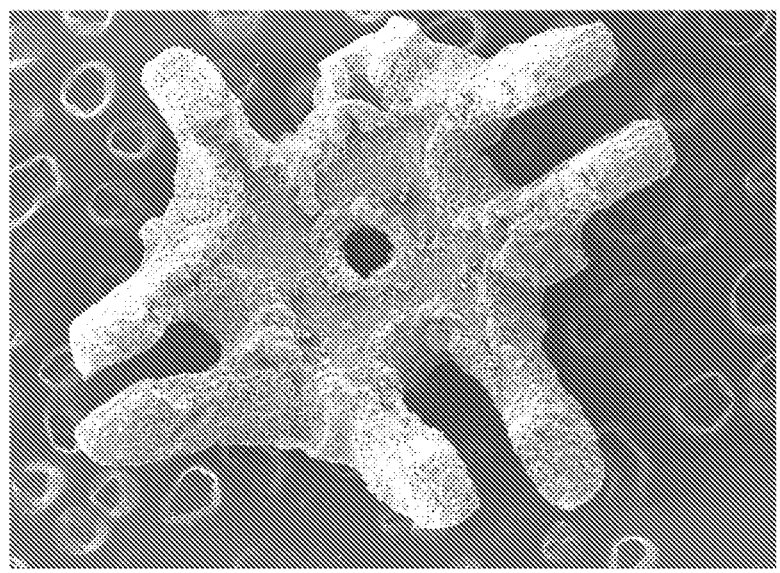
*FIG. 7A*  100μm
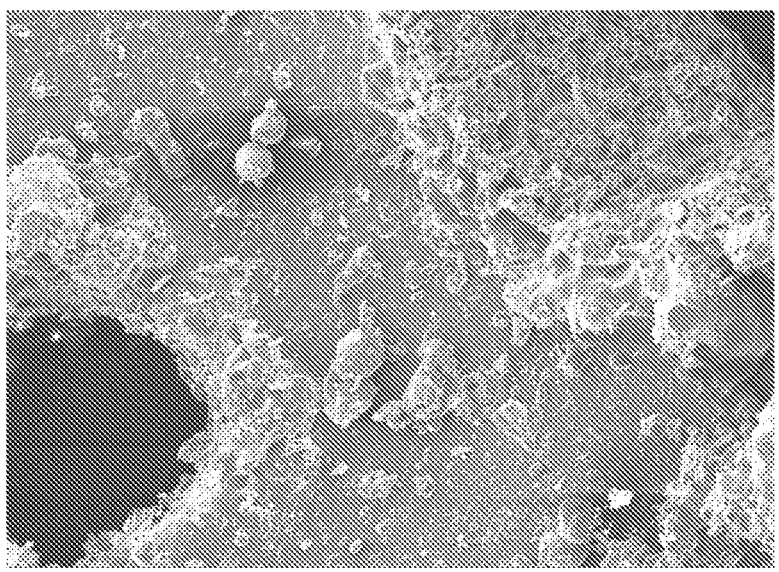
*FIG. 7B*  100μm

100μm

100μm

LASER METHOD FOR MAKING SHAPED CERAMIC ABRASIVE PARTICLES, SHAPED CERAMIC ABRASIVE PARTICLES, AND ABRASIVE ARTICLES

TECHNICAL FIELD

The present disclosure relates to abrasive particles, methods for making abrasive particles, and abrasive articles including abrasive particles.

BACKGROUND

It is known to make shaped ceramic abrasive particles. For example, one method includes sequentially: filling cavities on the surface of a microreplicated tool with a boehmite sol-gel, drying the sol-gel to form shaped boehmite particles within the cavities of the tool, removing the shaped boehmite particles from the cavities of the tool, and then sintering the shaped boehmite particles to form alpha-alumina shaped abrasive particles. While this method is conceptually simple, it is typically quite expensive to make the tool. Moreover, a different tool is desired to make a new desired shape of ceramic shaped abrasive particle.

Other methods of making shaped ceramic abrasive particles include a screen printing technique wherein a sol-gel ceramic precursor material is screen printed on a substrate, dried to form ceramic shaped abrasive precursor particles, removed from the substrate, and sintered to form the shaped ceramic abrasive particles. While somewhat less expensive, and typically with lower resolution than methods using a microreplicated tool, this technique still requires the preparation of a separate screen for each desired shape of the shaped ceramic abrasive particles.

SUMMARY

In one aspect, the present disclosure provides a method comprising:

providing a layer of ceramic precursor material supported on a carrier, wherein the layer of ceramic precursor material comprises a ceramic precursor and free water; and cutting through the layer of ceramic precursor material using a laser beam to provide shaped ceramic precursor particles.

In some embodiments, the method further comprises:
drying the shaped ceramic precursor particles to provide dried shaped ceramic precursor particles;
calcining the dried shaped ceramic precursor particles to provide calcined shaped ceramic precursor particles; and
sintering the calcined shaped ceramic precursor particles to provide shaped ceramic abrasive particles.

In some embodiments, the method further comprises:
drying the shaped ceramic precursor particles to provide dried shaped ceramic precursor particles;
calcining the dried shaped ceramic precursor particles to provide calcined shaped ceramic precursor particles;
impregnating the calcined shaped ceramic precursor particles with an impregnating composition comprising a mixture comprising a second liquid medium and at least one of a metal oxide or precursor thereof to provide impregnated calcined shaped ceramic precursor particles, wherein the impregnating composition impregnates the calcined shaped ceramic precursor particles to a lesser degree on surfaces formed by the cutting of the laser beam than other surfaces of the calcined shaped ceramic precursor particles; and optionally sintering the impregnated calcined shaped ceramic precursor particles to provide shaped ceramic abrasive particles.

In another aspect, the present disclosure provides a method comprising:

providing a layer of ceramic precursor material supported on a carrier, wherein the layer of ceramic precursor material comprises a ceramic precursor and free water; and scoring the layer of ceramic precursor material using a laser beam to provide a scored layer of ceramic precursor material.

In some embodiments, the method further comprises:
breaking the scored layer of ceramic precursor material along score lines to provide shaped ceramic precursor particles;
calcining the shaped ceramic precursor particles to provide calcined shaped ceramic precursor particles; and
sintering the calcined shaped ceramic precursor particles to provide shaped ceramic abrasive particles.

In some embodiments, the method further comprises:
drying the scored layer of ceramic precursor material to provide a dried scored layer of ceramic precursor material;
breaking the dried scored layer of ceramic precursor material along score lines to provide dried shaped ceramic precursor particles;
calcining the dried shaped ceramic precursor particles to provide calcined shaped ceramic precursor particles; and
sintering the calcined shaped ceramic precursor particles to provide shaped ceramic abrasive particles.

In some embodiments, the layer of ceramic precursor material is provided by partially drying a sol-gel ceramic precursor layer. In some embodiments, the layer of ceramic precursor material is provided by partially drying a sol-gel ceramic precursor layer. In some embodiments, the layer of ceramic precursor material is substantially nonflowable due to gravity. In some embodiments, the layer of ceramic precursor material has a solids content in a range of from 60 to 70 percent by weight.

Advantageously, methods according to the present disclosure can be used prepare shaped ceramic abrasive particles without need of expensive microreplicated tooling, and can be rapidly and inexpensively converted between desired particle shapes. Further, methods according to the present disclosure can be used to prepare shaped ceramic abrasive particles that would be prone to cracking during drying using microreplicated tooling or screen printing. Hence, methods of according to the present disclosure can be used to prepare shaped ceramic abrasive particles that have heretofore been inaccessible on a reliable and economical basis.

In yet another aspect, the present disclosure provides shaped ceramic abrasive particles prepared according to any method according the present disclosure.

In yet another aspect, the present disclosure provides shaped ceramic abrasive particles, wherein each of the shaped ceramic abrasive particles independently comprises a body member and at least three rod-shaped members extending from the body member.

In yet another aspect, the present disclosure provides an abrasive article comprising shaped ceramic abrasive particles according to the present disclosure adhered with a binder.

In another aspect, the present disclosure provides shaped ceramic abrasive particles, wherein the shaped ceramic abrasive particles are substantially planar and comprise a body member and at least three rod-shaped members extending from the body member. In some embodiments, each one of the at least three rod-shaped members has a cross-sectional profile independently selected from a circle, an ellipse, a square, a rectangle, or a triangle.

Depending on conditions, various unusual shapes of shaped ceramic abrasive particles can be made by methods according to the present disclosure. For example, in some embodiments, the at least three rod-shaped members are out of plane with the body member, and wherein the at least three rod-shaped members extend from the same side of the body member (that is, they have at least one directional component in common).

In some embodiments, the body member has an opening therein. In some embodiments, at least two of the rod-shaped members are collinear. For example, in some embodiments, said at least three rod-shaped members consists of first, second, third, fourth, fifth, six, seventh, and eighth rod-shaped members. In some embodiments, the first and second rod-shaped members are collinear, wherein the third and fourth rod-shaped members are collinear, wherein the fifth and sixth rod-shaped members are collinear, wherein the seventh and eighth rod-shaped members are collinear, wherein the first and second rod-shaped members are collinear, wherein the third and fourth rod-shaped members are collinear, wherein the fifth and sixth rod-shaped members are collinear, wherein the seventh and eighth rod-shaped members are collinear, wherein the first and third rod-shaped members are parallel, and wherein the fifth and seventh rod-shaped members are parallel. In some of these embodiments, the first and fifth rod-shaped members are perpendicular to each other.

And, in another aspect, methods of the present disclosure can be used to provide shaped ceramic abrasive particles, wherein each of the shaped ceramic abrasive particles has a body portion bounded by a peripheral loop portion having a roughened surface texture as compared to the body portion.

In another aspect, methods of the present disclosure can be used to provide shaped ceramic precursor particles, wherein the shaped ceramic precursor particles have a peripheral loop portion encircling and abutting an interior portion, and wherein the peripheral loop portion comprises alpha alumina, and the interior portion comprises an alpha alumina precursor and is free of alpha alumina.

In another aspect, methods of the present disclosure can be used to provide shaped ceramic abrasive particles, wherein the shaped ceramic abrasive particles have a peripheral loop portion encircling and abutting, but not fully enclosing, an interior portion, and wherein the peripheral loop portion has a different microcrystalline structure than the interior portion.

In another aspect, methods of the present disclosure can be used to provide shaped ceramic precursor particles, wherein each of the shaped ceramic precursor particles has first and second opposed nonadjacent major surfaces, a peripheral surface extending between the first and second major surfaces, wherein the peripheral surface comprises an ablated region extending along the peripheral surface adjacent to the first major surface but not contacting the second major surface, and a fractured region extending along the peripheral surface adjacent the second major surface but not contacting the first major surface.

In another aspect, methods of the present disclosure can be used to provide shaped ceramic abrasive particles, wherein each of the shaped ceramic abrasive particles has first and second opposed nonadjacent major surfaces, a peripheral surface extending between the first and second major surfaces, wherein the peripheral surface comprises an ablated region extending along the peripheral surface adjacent to the first major surface but not contacting the second major surface, and a fractured region extending along the peripheral surface adjacent the second major surface but not contacting the first major surface.

In another aspect, the present disclosure provides shaped ceramic abrasive particles, wherein each of the shaped ceramic abrasive particles comprises first and second opposed major surfaces that are connected by first and second opposed sides and first and second opposed ends, wherein the first and second opposed major surfaces are substantially smooth, wherein the first and second opposed sides and the first and second opposed ends have a surface topography comprising tortuous rounded micrometer-scale projections and depressions, wherein the first side abuts the first major surface forming an acute dihedral angle, and wherein the second side abuts the first major surface forming obtuse dihedral angle.

In some embodiments, shaped ceramic abrasive particles according to the present disclosure comprise alpha-alumina. In some embodiments, the shaped ceramic abrasive particles have a size distribution corresponding to an abrasives industry recognized nominal grade.

Advantageously, shaped ceramic abrasive particles according to the present disclosure may have compositional gradients, shapes, and/or structures that have not been heretofore readily accessible, which may result in low packing density, increased particle to binder adhesion (for example, due to the texture on the abrasive particle surface), and/or abrading performance.

Accordingly, in yet another aspect, the present disclosure provides abrasive articles comprising shaped ceramic abrasive particles according to the present disclosure adhered with, or retained in, a binder (e.g., as in a bonded abrasive article), or secured to a backing by a binder (e.g., as in a coated abrasive article).

As used herein:

the term "ablated region" refers to a region of a surface formed by melting, evaporation, and/or vaporization (e.g., as caused by a laser beam), generally characterized by an irregular topography comprising rounded and/or sharp projections and smooth depressions;

the term "calcining" refers to heating to at least a temperature at which any remaining volatiles (including all organic materials and water) that were present in a dried substrate are removed;

the term "drying" refers to removing at least some water contained in the article being dried, but not necessarily all water;

the term "gravity" refers to gravitational force at the surface of the earth;

the term "micrometer-scale" refers to a size range of from 0.1 micrometer to 1 millimeter;

the term "shaped particle" refers to a particle having a geometry resulting from a predetermined geometry used in making of the particle (for example, the geometry may be a result of molding in a cavity having a predetermined precise geometry, or may be a result of a particular cutting pattern of by a cutting laser);

the term "sintering" refers to heating to at least a temperature at which chemical bonds form between contacting ceramic particles of a calcined substrate, typically resulting in increased strength and density; and the term "substantially planar" means having a flat shape with a relatively broad surface in relation to thickness (for example, the thickness may be at least 2, 3, 4, 5, or even 10 times less than the length and/or width of the surface).

In this application, it is intended that the open-ended term "comprise" also envisions embodiments wherein the term "comprise" is replaced by the terms "consist essentially of" or "consist of."

The foregoing aspects and embodiments may be implemented in any combination thereof, unless such combination is clearly erroneous in view of the teachings of the present disclosure. The features and advantages of the present disclosure will be further understood upon consideration of the detailed description as well as the appended claims.

BRIEF DESCRIPTION OF THE DRAWINGS

FIG. 1A is a flow diagram of an exemplary method according to the present disclosure;

FIG. 1B is an enlarged schematic view of layer of ceramic precursor material 140 in FIG. 1A taken along line 1B;

FIG. 2A is a schematic top view of exemplary shaped ceramic precursor particles 200 prepared according to a method of the present disclosure;

FIG. 2B is a schematic perspective view of an exemplary shaped ceramic abrasive particle 270 according to the present disclosure;

FIG. 7A is a scanning electron micrograph of an exemplary shaped ceramic abrasive particle wherein the rod-shaped members are out of plane with the body member;

FIG. 7B is an enlarged view of the exemplary shaped ceramic abrasive particle shown in FIG. 5A;

Figure 3A:
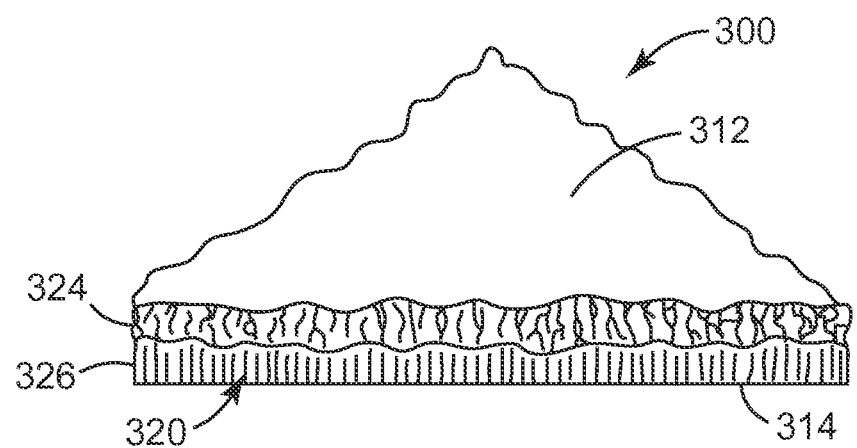
FIG. 3A is a schematic perspective view of an exemplary shaped ceramic precursor particle 300 according to the present disclosure.

While the above-identified drawing figures set forth several embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1A, in one exemplary method 100 according to the present disclosure, layer of ceramic precursor material 140 is supported on carrier 190. As layer of ceramic precursor material 140 passes laser beam 180, laser beam 180 forms cuts 184 (shown in FIG. 1B) through the layer of ceramic precursor material 140 to form shaped ceramic precursor particles 142, which are further dried by heater 150 and flexed by passing over roller 195 resulting in separation from carrier 190 of dried shaped ceramic precursor particles 144. The dried shaped ceramic precursor particles 144 are optionally calcined to form calcined dried shaped ceramic precursor particles 146, optionally impregnated with inorganic salts, and sintered to provide shaped ceramic abrasive particles 160. While it is typical to dry shaped ceramic precursor particles 142 to facilitate handling, it is not a requirement. Similarly, while it is typical to calcine the dried shaped ceramic precursor particles 144, and impregnate the resultant calcined dried shaped ceramic precursor particles 146 with inorganic rare earth salts to increase hardness prior to sintering, these are not requirements.

In embodiments wherein the laser only partially penetrates (e.g., scores) the layer of ceramic precursor material 140, it forms latent shaped ceramic precursor particles which, after further drying and flexing by passing over roller 195, separate from one another as dried shaped ceramic precursor particles 144. While a roller is shown in the embodiment in FIG. 1A, it will be recognized that other methods may also be used such as, for example, beater bars or passing over a bar or knife edge.

In the embodiment shown in FIGS. 1A and 1B, the layer of ceramic precursor material 140, i.e., a material that when dried and sintered forms a ceramic material (e.g., a boehmite sol-gel layer), is coated onto carrier 190, although other methods may also be used. Typical coating processes are best-suited for materials with relatively lower viscosity than the viscosity that is desirable for the laser cutting (that is, cutting with a laser beam) step. Accordingly, layer of ceramic precursor material 140 is partially dried by heater 115 prior to the laser cutting step.

In a variation of the process described in FIGS. 1A and 1B, the laser beam does not cut through the layer of ceramic precursor material, but instead only cuts partially through or forms perforations thereby forming score lines in the layer of ceramic precursor material to form a scored layer of ceramic precursor material, which is optionally further dried (for example, using a heater and/or oven), and then broken into dried shaped ceramic precursor particles along the score lines. The resultant dried shaped ceramic precursor particles are then processed as described in FIG. 1A to provide shaped ceramic abrasive particles.

The above exemplary processes will now be discussed in greater detail.

The first step involves coating, onto a carrier, a layer of ceramic precursor material (e.g., as a seeded or un-seeded dispersion containing particles of ceramic precursor) that can ultimately be converted into ceramic material. Examples of suitable ceramic precursors include: alpha alumina precursors such as aluminum oxide monohydrate (for example, boehmite); and zirconia precursors and mixed zirconia-alumina precursors such as those described in U.S. Pat. No. 5,551,963 (Larmie). The particles of ceramic precursor may be dispersed in (or mixed with) a liquid that comprises a volatile component that includes water, although this is not a requirement. Dispersions and/or slurries preferably comprise a sufficient amount of the liquid for the viscosity of the dispersion to be sufficiently low to enable a quality coating on the carrier, but not so much liquid as to cause subsequent removal of the liquid dispersion to be prohibitively expensive. The dispersion typically comprises from 30 to 50 percent by weight of ceramic precursor particles and from 50 to 70 percent by weight of the volatile component, although other weight ratios may also be used. The physical properties of the resulting shaped ceramic abrasive particles will generally depend upon the type of material used in the dispersion.

Boehmite dispersions can be prepared by known techniques or can be obtained commercially. Examples of commercially available boehmite include products having the trade designations "DISPERAL", and "DISPAL", both available from Sasol North America, Inc. and "HiQ-40" available from BASF Corporation. These aluminum oxide monohydrates are relatively pure, that is, they include relatively little, if any, hydrate phases other than monohydrates, and have a high surface area.

In one embodiment, the layer of ceramic precursor material (e.g., dispersion of ceramic precursor particles) is in a gel state. As used herein, a "gel" is a three-dimensional network of solids dispersed in a liquid. The dispersion may contain a modifying additive or precursor of a modifying additive. The modifying additive can function to enhance one or more desirable properties of the shaped ceramic abrasive particles or increase the effectiveness of the subsequent sintering step. Modifying additives or precursors of modifying additives can be in the form of soluble salts, typically water-soluble salts. They typically include a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the dispersion can be varied based on skill in the art. Typically, the introduction of a modifying additive or precursor of a modifying additive will cause the dispersion to gel. The dispersion can also be induced to gel by application of heat over a period of time.

The dispersion of ceramic precursor particles can also contain a nucleating agent to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such dispersions is disclosed in U.S. Pat. No. 4,744,802 (Schwabel).

A peptizing agent can be added to dispersion of ceramic precursor particles to produce a more stable hydrosol or colloidal dispersion. Suitable peptizing agents include monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The dispersion of ceramic precursor particles can be created or formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired.

Additional additives useful for dispersions of alpha-alumina ceramic precursor materials include: silica and iron oxide as disclosed in U.S. Pat. No. 5,645,619 (Erickson et al.); zirconia as disclosed in U.S. Pat. No. 5,551,963 (Larmie); and nucleating agents as disclosed in U.S. Pat. No. 6,277,161 (Castro).

Coating of a dispersion of ceramic precursor material to form the layer of ceramic precursor material may be accomplished by any suitable method including, for example, knife coating, bar coating, slot die coating, curtain coating, gravure coating, or roll coating. The carrier is typically a thin readily handleable substrate such as a paper, film, foil, belt, although other substrates may be used if desired. The carrier may be selected to releasably adhere to the shaped ceramic precursor particles, but this is not a requirement; for example, in those cases in which the substrate is cut through during the laser cutting operation and subsequently burned off during calcining Examples of suitable carriers include papers (for example, including siliconized paper or waxed paper), polymer films (for example, polypropylene, or polyester film), and metal belts (for example, stainless steel belts). The carrier may be treated with a release agent (e.g., a fluorochemical, peanut oil, or silicone) prior to use, if desired.

Second, after coating, the dispersion of ceramic precursor material is optionally partially dried an amount sufficient to render the layer of ceramic precursor material non-flowable under action of gravity alone (for example, over a span of 5 to 20 minutes). This helps to prevent sagging or slumping of the shaped ceramic precursor particles after laser cutting until they can be further processed. If appropriately dried, the layer of ceramic precursor material is typically substantially free of cracks caused by drying the sol-gel layer. However, excessive drying can lead to undesirable cracking of the layer of ceramic precursor material. For alpha-alumina ceramic precursor materials, a solids content after partial drying of from 40 to 75 percent by weight, and more typically 60 to 70 percent by weight, are particularly useful. Suitable devices for partially drying the coated dispersion include heaters (for example, infrared heaters, heat guns, radiated heat from below through the carrier and/or microwave lamps), ovens, hot cans, superheated steam, and forced air.

Third, the layer of ceramic precursor material is cut so as to form shaped ceramic precursor particles. The laser used for cutting the layer of ceramic precursor material may be any suitable laser operating at an infrared, visible, and/or ultraviolet output wavelength. Examples of suitable lasers include gas lasers, excimer lasers, solid state lasers, and chemical lasers. Exemplary gas lasers include: carbon dioxide lasers (for example, those which produce power up to 100 kW at 10.6 μm); argon-ion lasers (for example, those which emit light at 458 nanometers (nm), 488 nm or 514.5 nm); carbon-monoxide lasers (for example, those which can produce power of up to 500 kW); and metal ion lasers, which are gas lasers that generate deep ultraviolet wavelengths. Helium-silver (HeAg) 224 nm lasers and neon-copper (NeCu) 248 nm lasers are two examples. These lasers have particularly narrow oscillation linewidths of less than 3 GHz (0.5 picometers). $CO_2$ lasers are typically well-suited for practice of the present disclosure.

Chemical lasers are powered by a chemical reaction, and can achieve high powers in continuous operation. For example, in the hydrogen fluoride laser (2700-2900 nm) and the deuterium fluoride laser (3800 nm), the reaction is the combination of hydrogen or deuterium gas with combustion products of ethylene in nitrogen trifluoride.

Excimer lasers are powered by a chemical reaction involving an excited dimer (that is, an "excimer") which is a short-lived dimeric or heterodimeric molecule formed from two species (atoms), at least one of which is in an excited electronic state. They typically produce ultraviolet light. Commonly used excimer molecules include F2 (fluorine, emitting at 157 nm), and noble gas compounds (ArF (193 nm), KrCl (222 nm), KrF (248 nm), XeCl (308 nm), and XeF (351 nm)).

Solid state laser materials are commonly made by doping a crystalline solid host with ions that provide the required energy states. Examples include ruby lasers (for example, made from ruby or chromium-doped sapphire). Another common type is made from neodymium-doped yttrium aluminum garnet (YAG), known as Nd:YAG. Nd:YAG lasers can produce high powers in the infrared spectrum at 1064 nm. Nd:YAG lasers are also commonly frequency doubled to produce 532 nm when a visible (green) coherent source is desired.

Ytterbium, holmium, thulium, and erbium are other common dopants in solid state lasers. Ytterbium is used in crystals such as Yb:YAG, Yb:KGW, Yb:KYW, Yb:SYS, Yb:BOYS, $Yb:CaF_2$, typically operating around 1020-1050 nm. They are potentially very efficient and high powered due to a small quantum defect. Extremely high powers in ultrashort pulses can be achieved with Yb:YAG. Holmium-doped YAG crystals emit at 2097 nanometers (nm) and form an efficient laser operating at infrared wavelengths strongly absorbed by water-bearing tissues. The Ho-YAG is usually operated in a pulsed mode. Titanium-doped sapphire (Ti:sapphire) produces a highly tunable infrared laser, commonly used for spectroscopy as well as the most common ultrashort pulsed laser. Solid state lasers also include glass or optical fiber hosted lasers, for example, with erbium or ytterbium ions as the active species. Fiber lasers (e.g., infrared fiber lasers) are one exemplary type of solid state laser suitable for practicing the present disclosure. Fiber lasers have a fiber core (typically having a diameter in a range from 0.1 micrometer (μm)-1000 μm) that is the lasing media.

The laser may be used in pulsed and/or continuous wave mode. For example, the laser may operate at least partially in continuous wave mode and/or at least partially in pulsed mode. Individual pulses may be temporally profiled. One specific example of a suitable pulse laser is a $CO_2$ laser, model Diamond 84, available from Coherent, Inc. of Santa Clara, Calif., which has the following technical specifications: RF excited, sealed $CO_2$ pulsed laser, scanner-based, input beam diameter=7.0 millimeters (mm), and final beam diameter=0.250 mm; operating wavelength=10.6 μm; max power at 60 percent duty cycle at one kilohertz (kHz)=300 W; pulse energy range=10-450 millijoules (mJ); pulse width range=10-1000 microseconds (μS); and pulse rise and fall time<60 μS.

One specific example of a suitable continuous wave laser is a $CO_2$ laser, Evolution series, available from Synrad of Mukilteo, W. Va., which has the following technical specifications: Wavelength: 10.6 μm; Max power: –Continuous Mode: 100 watts (W), –Pulsed Mode: 150 W; Modulation: Up to 20 kHz; Rise Time: <150 μS; Description: RF excited, sealed $CO_2$ Pulsed laser to CW output; Method of Delivery: XY Plotter based; Input beam diameter: 4.0 mm; Final beam diameter: 0.250 mm.

In those embodiments in which an aluminum-based aqueous sol-gel comprises the layer of ceramic precursor material a $CO_2$ laser tuned to a wavelength of 9.37 micrometers may be particularly useful.

The effectiveness of laser cutting is highly sensitive to the degree to which the laser beam is absorbed by medium (e.g., layer of ceramic precursor material) being cut. At some ultraviolet wavelengths (e.g., UV-B or UV-C wavelengths), absorption may be appreciable, however, at longer wavelengths absorption typically become more problematic, and it is preferred that the wavelength of the laser beam is either tuned to a specific absorption of the layer of ceramic precursor material or an absorber (i.e., a material that is highly absorptive at the laser wavelengths) is added to the ceramic precursor. The role of absorbers is to absorb electromagnetic radiation of the laser beam and convert it to heat. Suitable absorbers preferably have absorption bands in the ultraviolet, visible, and/or infrared portions of the electromagnetic spectrum. In general, the absorber should have a high molar extinction coefficient as the wavelengths of the laser beam. Preferably, the absorber has a molar extinction coefficient at of least 1,000 (moles per liter)$^{-1}$-centimeter$^{-1}$ ($M^{-1}cm^{-1}$), 500 $M^{-1}cm^{-1}$, 10,000 $M^{-1}cm^{-1}$ or even at least 25000 $M^{-1}cm^{-1}$ at the principal wavelength of the laser beam. Combinations of absorbers can also be used. If present, absorber(s) are preferably present in sufficient amount to absorb at least 5, 10, 20, 30, 40, 50, 60, 70, or even at least 80 percent of the incident electromagnetic radiation of the laser beam. Quantities used will vary depending on the absorbance spectrum of the absorber(s), the wavelength(s) of the laser beam, and the thickness of the layer of sol-gel ceramic precursor and may be readily determined, for example, according to the Beer-Lambert Law.

Typically, a focused laser spot size is limited to a spot size of about 10 times the laser wavelength. So for UV lasers, the laser spot can be focused to a diameter of less than 10 micrometers. However, for infrared lasers, the focused spot diameter is typically on the order of from 100 to 250 micrometers, although this is not a requirement. In some embodiments, the ultimately produced shaped ceramic abrasive particles will have sharp edges and corners; preferably having a radius of curvature of less than or equal to 6 micrometers. Achieving small corner radius of curvature may be difficult with larger spot sizes. For example, it is difficult to use a laser beam with a 250 micrometers wide spot diameter to draw a corner less that is than 10 micrometers in radius.

Suitable absorbers include dyes and pigments (preferably with at least some water-solubility) such as, for example, phthalazines, cyanines, pyryliums, luminols, Naphthol Green B (acid Green 1), Indocyanine green, naphthoquinones, anthraquinones, tetrakis amminium compounds, metal thiolenes, sulfonated or carboxylated metal phthalocyanines, and carbon black. Examples of commercially available near infrared dyes include those available as: TETRAARYL-DIAMINE, product code FHI 104422P, from Fabric Color Holding Company, Paterson, N.J.; LUNIR5 NIR absorbing pigment and LUWSIR-3 Water Soluble NIR Absorber from Lumichem, Budapest, Hungary; and EPOLIGHT 2735 NEAR INFRARED DYE from Epolin, Inc. Newark, N.J. Preferably, the absorber(s) have at least some solubility or dispersibility in water, although this is not a requirement. In order to increase water-dispersibility, absorber(s) may be used in combination with a surfactant and/or dispersant to facilitate incorporation into the layer of ceramic precursor material.

While not required, it is preferable that the carrier supporting the layer of ceramic precursor material not be highly absorptive of the laser beam in order to minimize damage of the carrier. This can be achieved, for example, by laser selection, carrier selection, inclusion of absorber(s) in the layer of ceramic precursor material, or a combination thereof. For example, typical boehmite sol-gels have an absorption maximum at about 9.4 micrometers, a wavelength at which absorption by polyethylene terephthalate (PET) polyester is minimal. In such a case a laser with a wavelength of about 9.4 micrometers is preferably used. Accordingly, it is desirable to choose a laser with a wavelength that is highly absorbed by layer of ceramic precursor material such that little laser radiation reaches the carrier.

The laser beam is typically optically directed or scanned and modulated to form a desired cutting pattern that achieves the desired shaped ceramic abrasive particle shape. The laser beam may be directed through a combination of one or more mirrors (for example, rotating mirrors and/or scanning mirrors) and/or lenses. Alternatively or in addition, the substrate can be moved relative to the laser beam. In yet another configuration, the focusing element can move relative to the web (e.g., one or more of X, Y, Z alpha, or theta directions). The laser beam may be scanned at an angle of incidence relative to the surface (e.g., upper surface) of the layer of ceramic precursor material. For example, the angle of incidence may be 90° (i.e., perpendicular to the layer of ceramic precursor material), 85°, 83°, 80°, 70°, 60°, 50°, 45° or even less.

Typically, the cutting pattern is generated such that a high packing density (for example, a maximum packing density) of the resulting shaped ceramic precursor particles is achieved. For example, the pattern may cut the layer of ceramic precursor material into a close-packed array of shapes such as triangles, squares, rectangles, or hexagons.

FIG. 2A shows an exemplary array 200 of shaped ceramic precursor particles 210. Under at least some laser cutting conditions (for example, those conditions in which the laser beam has cut substantially or completely through the layer of ceramic precursor material), heating that occurs along the cut lines 230 may result in flash evaporation of water in the sol-gel thereby forming a porous surface texture, which then remains immobilized (that is, "frozen in place") throughout subsequent processing steps. Accordingly, shaped ceramic precursor particles 210 may, in some embodiments, have a body portion 237 bounded by a peripheral loop portion 235 having a roughened surface texture as compared to the surface texture of body portion 237, while in other embodiments a smooth surface along cut lines can be observed after laser cutting. Calcining and sintering shaped ceramic precursor particles 210 results in shaped ceramic abrasive particles 270 (see FIG. 2B, wherein surface texture of the shaped ceramic precursor particles 210 carries through to shaped ceramic abrasive particles 270. Hence, shaped ceramic abrasive particles 270 (shown in FIG. 2B) may, in some embodiments, have a body portion 277 bounded by a peripheral loop portion 275 having a roughened surface texture as compared to the body portion 277 (for example, as shown in FIGS. 7A and 7B). The roughened surface texture may facilitate electrostatic coating and/or adhesion to binder resin (for example, in a make coat or slurry coat).

In some embodiments, the laser cuts penetrate through the layer of ceramic precursor material. In some embodiments, the laser does not penetrate through the layer of ceramic precursor material, but cuts score lines along which the shaped ceramic precursor particles can be obtained, generally after further drying, by breaking the layer of ceramic precursor material along the score lines. Breakage may be accomplished, for example, by ultrasonic vibration, beater bars, rollers, scrapers, and combinations thereof.

While not a requirement, for efficiency the layer of ceramic precursor material is scored by the laser beam such that it forms a close-packed array of latent abrasive precursor particles, which if the laser beam cuts completely through the layer of ceramic precursor material are separated but adjacent to one another, or, if the laser beam cuts only partially through the layer of ceramic precursor material, which are joined to one another along score lines formed by the laser beam in the layer of ceramic precursor material.

In embodiments in which the laser beam cuts completely through the layer of ceramic precursor material, subsequent drying and deformation (e.g., flexing as carrier 190 travels around roller 195 as shown in FIG. 1A) leads to separation of the shaped ceramic precursor particles from the carrier.

In embodiments in which the laser beam cuts only partially through the layer of ceramic precursor material, subsequent drying and deformation (e.g., flexing as carrier 190 travels around roller 195 as shown in FIG. 1A) causes cracks to form along the score lines, thereby facilitating separation of the shaped ceramic precursor particles from one another and the carrier. For best results, the layer of ceramic precursor material should be allowed to dry a point where cracks (e.g., similar in appearance to mud cracks) begin to form at peripheral regions of the layer.

Shaped ceramic precursor particles formed in this manner may be characterized by peripheral surfaces with dual characteristics: a portion formed by evaporation/ablation of precursor ceramic material, and a portion formed by fracture of the layer after at least partial drying as shown in FIG. 3A. Referring now to FIG. 3A, shaped ceramic precursor particle 300 has first and second opposed nonadjacent major surfaces 312, 314 and peripheral surface 320 extending between first and second major surfaces 312, 314. Peripheral surface 320 comprises an ablated region 324 extending along peripheral surface 320 adjacent to first major surface 312, but not contacting second major surface 314. Fractured region 326 extends along peripheral surface 320 adjacent the second major surface, but does not contact first major surface 312.

Figure 3B:
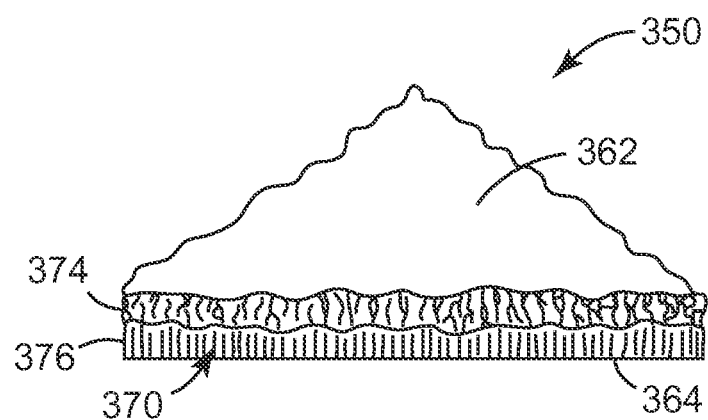
FIG. 3B is a schematic perspective view of an exemplary shaped ceramic abrasive particle 350 according to the present disclosure.
Figure 4:
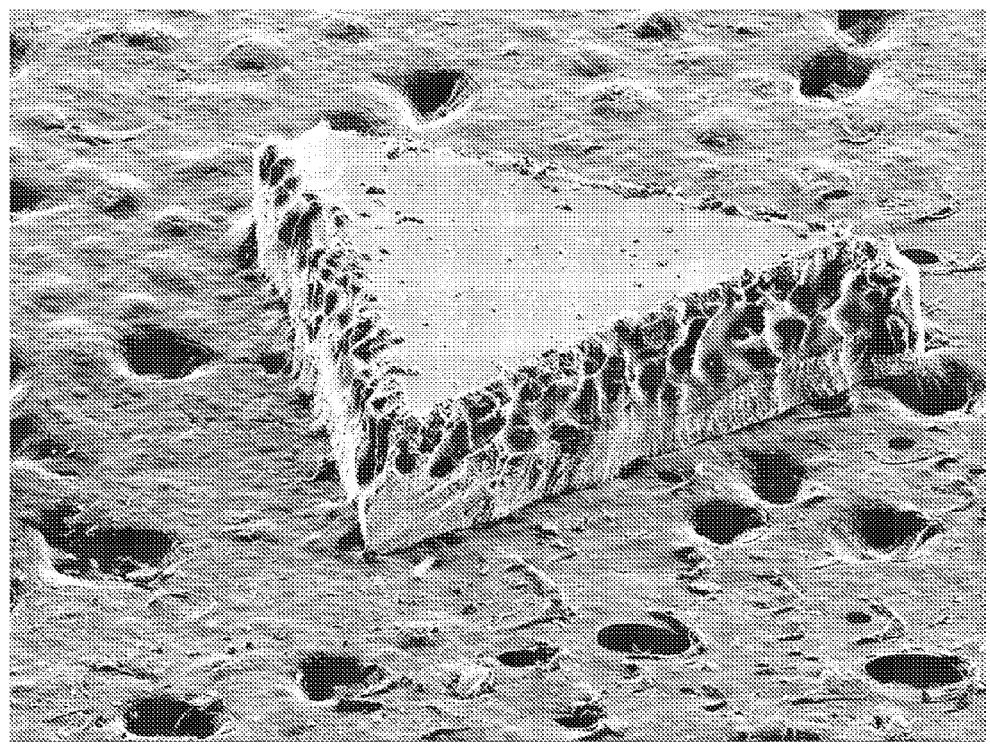
FIG. 4 is a scanning electron micrograph of an exemplary shaped ceramic abrasive particle 350.

Upon conversion of the shaped ceramic precursor particles shown in FIG. 3A to shaped ceramic abrasive particles (shown in FIG. 3B), for example, by sintering, the resultant shaped ceramic abrasive particles 350. Referring now to FIG. 3B, shaped ceramic abrasive particle 350 has first and second opposed nonadjacent major surfaces 362, 364 and peripheral surface 370 extending between first and second major surfaces 362, 364. Peripheral surface 370 comprises an ablated region 374 extending along peripheral surface 370 adjacent to first major surface 362, but not contacting second major surface 364. Fractured region 376 extends along peripheral surface 320 adjacent the second major surface, but does not contact first major surface 312. As shown, ablated region 374 and fractured region 376 abut one another and comprise the entire area of the peripheral surface, although this is not a requirement. For further reference, a photomicrograph of an exemplary shaped ceramic precursor particle according to this embodiment is shown in FIG. 4. Depending on the depth of the score lines used to form the shaped ceramic precursor particles, either of the fractured region or the ablated region may comprise a majority of the area of the peripheral surface. To facilitate rapid processing, it is preferred that the depth of the score lines is minimized, leading to a relatively larger fractured region.

When using the laser to form score lines that only partially penetrate the layer of ceramic precursor material, in some cases, undesirable cracks not corresponding to the score lines may form as well. To minimize this effect, it may be desirable to use the laser beam to divide the layer of ceramic precursor material into multiple regions bounded by a line that extends completely through the layer of ceramic precursor material. This boundary line (which may have any width, but it preferably the width of a single laser scan line), serves to interrupt the propagation of any extraneous crack that may form in a portion of the layer of ceramic precursor material, thereby reducing waste. Accordingly, in some embodiments, boundary lines are formed in the layer of ceramic precursor material (e.g., surrounding or within a close-packed array of latent dried ceramic precursor particles) by cutting through the layer of ceramic precursor material using the laser beam, such that the boundary lines separate portions of the close-packed array of latent dried ceramic precursor particles.

In some embodiments, the shaped ceramic abrasive particles comprise thin bodies having opposed major surfaces connected by at least one sidewall and separated by a thickness. In some embodiments, the thickness ranges between about 25 micrometers to about 500 micrometers. Typically, increasing thicknesses are associated with increasing dwell times for a given laser in order to achieve a useful level of cutting.

Advantageously, under some circumstances (e.g., wherein high laser power is used), extreme heating caused by the laser beam can result in conversion of the ceramic precursor material into ceramic adjacent cuts made by the laser beam. In the case of boehmite gel, this means that alpha alumina is formed at peripheral surfaces of the shaped ceramic precursor particles, while an interior portion of the particles remains in a precursor (e.g., at least partially dried boehmite sol-gel). Accordingly, methods according to the present disclosure can produce shaped ceramic precursor particles of the Type shown in FIG. 5A, wherein a shaped ceramic precursor particle 500 has a peripheral loop portion 510 encircling and abutting an interior portion 520. Peripheral loop portion 510 (e.g., see FIG. 18B) has a different microcrystalline structure than interior portion 520 (e.g., see FIG. 18A).

Figure 5A:
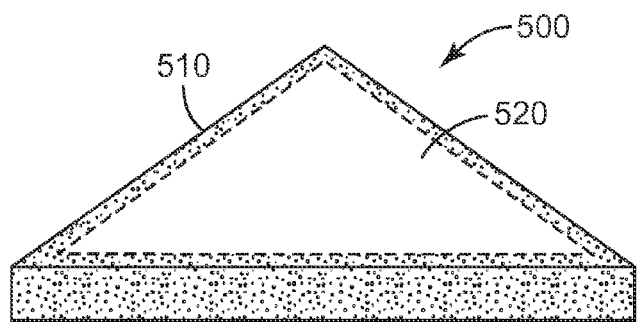
FIG. 5A is a schematic perspective view of an exemplary shaped ceramic precursor particle 500 according to the present disclosure.
Figure 5B:
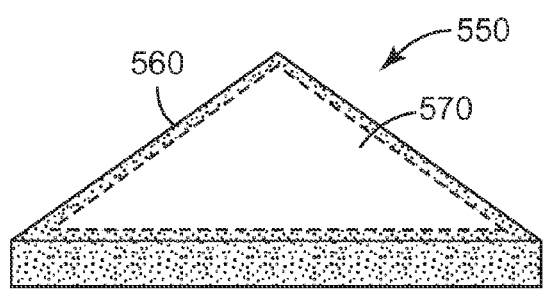
FIG. 5B is a schematic perspective view of an exemplary shaped ceramic abrasive particle 550 according to the present disclosure

Upon conversion of the shaped ceramic precursor particles shown in FIG. 5A to shaped ceramic abrasive particles (shown in FIG. 5B), for example, by sintering, the resultant shaped ceramic abrasive particles 550 have a peripheral loop portion 560 encircling and abutting an interior portion 570. Alpha alumina in the shaped ceramic precursor particles, peripheral loop portion 560 serves to control the formation of ceramic microcrystalline grains (e.g., alpha alumina microcrystalline grains) in the shaped ceramic abrasive particles, resulting in differences in microcrystalline structure between the peripheral loop portion and the interior portion.

Additionally, by using laser cutting processes according to the present disclosure, it is possible to easily make shaped ceramic abrasive particles with shapes that are not possible using conventional open molds due to shrinkage and/or cracking upon drying in the mold. Examples of such shapes include shaped ceramic abrasive particles that comprise a body member and at least three rod-shaped members extending from the body member. The rod shaped members may have any cross-sectional profile. For example, they may have cross-sectional profiles independently selected from a circle, an ellipse, a square, a rectangle, or a triangle. Unexpectedly, the present inventors have discovered that under some circumstances the rod-shaped members curl away from the carrier during the laser cutting operation. The degree of curl is typically influenced by humidity conditions during drying. More humid conditions during drying tend to reduce observed curl. In such cases, the at least three rod-shaped members are out of plane with the respect to the body member, and extend from the same side of the body member. This leads to shaped ceramic abrasive particles that have a low bulk packing density. For example, the shaped ceramic abrasive particles may have a bulk packing density of from 20 percent to 90 percent of the theoretical maximum, from 20 percent to 60 percent of the theoretical maximum, or from 20 percent to 40 percent of the theoretical maximum.

Shaped ceramic abrasive particle shapes wherein shrinkage in an open mold would lead to cracking and/or breaking include, for example, lambda, cross-hatch, T, Y, or tic-tac-toe patterns. Exemplary such shapes are shown in FIGS. 6A-6G.

Figure 6A:
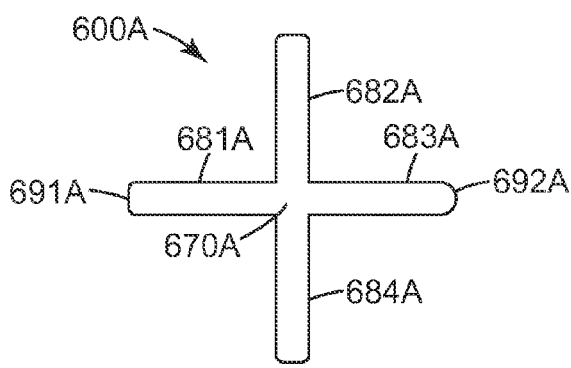
FIGS. 6A-6G are schematic perspective views of exemplary shaped ceramic abrasive particles according to the present disclosure.

For example, FIG. 6A shows a substantially planar shaped ceramic abrasive particle 600A comprising a body member 670A and four rod-shaped members 681A, 682A, 683A, and 684A extending from body member 670A, forming the shape of a cross. The ends of rod-shaped members may be squared off, substantially squared off as in end 691A, rounded as in end 692A, tapered, or some other shape, or the ends may collectively comprise mixture of the foregoing shapes.

Figure 6B:
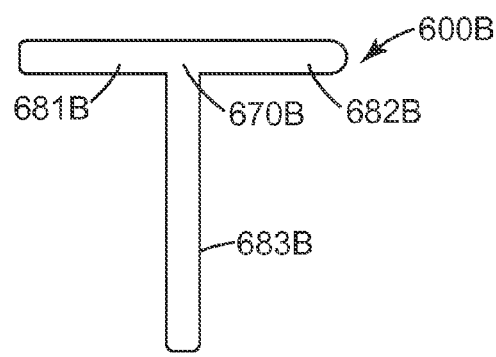

FIG. 6B shows a substantially planar shaped ceramic abrasive particle 600B comprising a body member 670B and three rod-shaped members 681B, 682B, and 683B extending from body member 670B, forming the shape of the letter T. In this embodiment, rod-shaped members 681B and 682B are collinear.

Figure 6C:
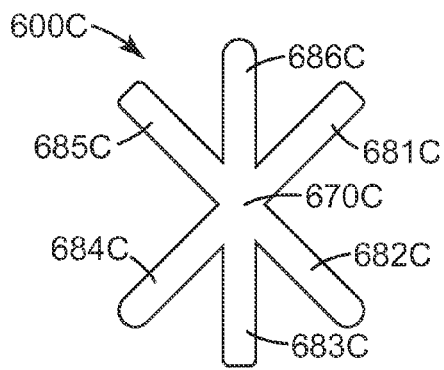

FIG. 6C shows a substantially planar shaped ceramic abrasive particle 600C comprising a body member 670C and six rod-shaped members 681C, 682C, 683C, 684C, 685C, and 686C extending from body member 670C, forming the shape of a star or an asterisk. In this embodiment, respective rod-shaped members 681C and 682C, 683C and 684C, and 685C and 686C are collinear.

Figure 6D:
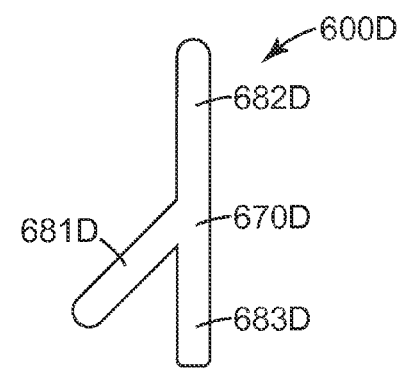

FIG. 6D shows a substantially planar shaped ceramic abrasive particle 600D comprising a body member 670D and three rod-shaped members 681D, 682D, and 683D extending from body member 670D, forming the shape of the Greek letter lambda. In this embodiment, rod-shaped members 681D and 682D are collinear.

In some embodiments, the shaped ceramic abrasive particles may be shaped such that the first and second rod-shaped members are collinear, the third and fourth rod-shaped members are collinear, the fifth and sixth rod-shaped members are collinear, the seventh and eighth rod-shaped members are collinear, the first and second rod-shaped members are collinear, the third and fourth rod-shaped members are collinear, the fifth and sixth rod-shaped members are collinear, the seventh and eighth rod-shaped members are collinear, the first and third rod-shaped members are parallel, and the fifth and seventh rod-shaped members are parallel. In some of these embodiments, the first and fifth rod-shaped members are perpendicular to each other.

Figure 6E:
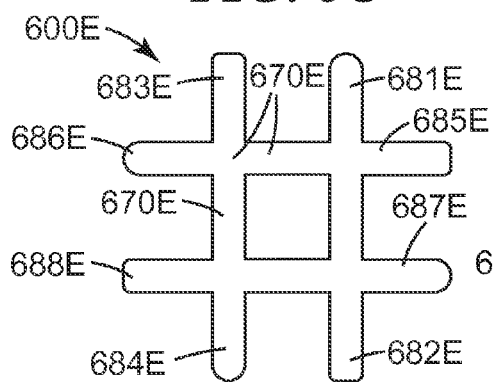

FIG. 6E shows a substantially planar shaped ceramic abrasive particle 600E comprising a body member 670E and eight rod-shaped members 681E, 682E, 683E, 684E, 685E, 686E, 687E, and 688E extending from body member 670E, which has an opening 665E therein. Rod-shaped members 681E and 682E, 683E and 684E, 685E and 686E, and 687E and 688E are collinear. Rod-shaped members 681E and 685E are perpendicular to each other, forming the shape of a tic-tac-toe grid. In this case, body member 670E has the shape of a hollow square.

Figure 6F:
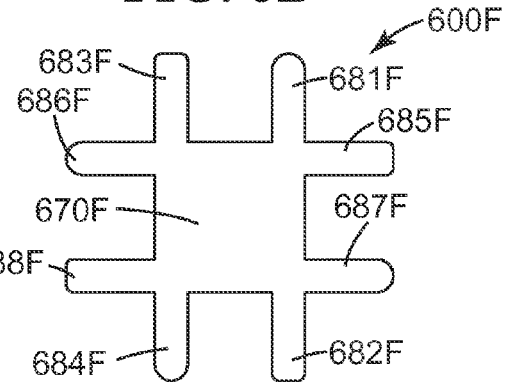

Similarly, FIG. 6F shows a substantially planar shaped ceramic abrasive particle 600F comprising a body member 670F and eight rod-shaped members 681F, 682F, 683F, 684F, 685F, 686F, 687F, and 688F extending from body member 670F. Rod-shaped members 681F and 682F, 683F and 684F, 685F and 686F, and 687F and 688F are collinear. Rod-shaped members 681F and 685F are perpendicular to each other, forming the shape of a filled in tic-tac-toe grid. In this case, body member 670F has the shape of a filled-in square.

Figure 6G:
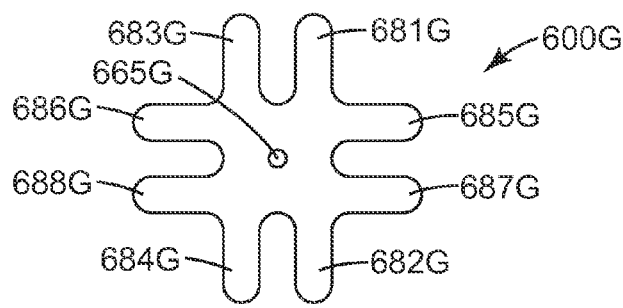

Likewise, FIG. 6G shows a substantially planar shaped ceramic abrasive particle 600G comprising a body member 670G and eight rod-shaped members 681G, 682G, 683G, 684G, 685G, 686G, 687G, and 688G extending from body member 670G, which has an opening 665G therein. Rod-shaped members 681G and 682G, 683G and 684G, 685G and 686G, and 687G and 688G are collinear. Rod-shaped members 681G and 685G are perpendicular to each other, forming a tic-tac-toe-type grid having a circular central opening centrally located in body member 670G.

Unexpectedly, the inventors have presently discovered that using laser processing techniques as described herein, it is possible to generate shaped ceramic abrasive particles wherein rod-shaped members extend from a body member and curl away from the carrier substrate during laser cutting, resulting in a shape wherein the rod-shaped members are out of plane with the respect to the body member, and extend from the same side of the body member. Such curling/bending of the rod-shaped members may result from differential shrinkage and/or decomposition of the carrier substrate during laser processing. An exemplary such shaped ceramic abrasive particle, produced according to Example 4 is shown in FIGS. 7A and 7B.

Figure 8A:
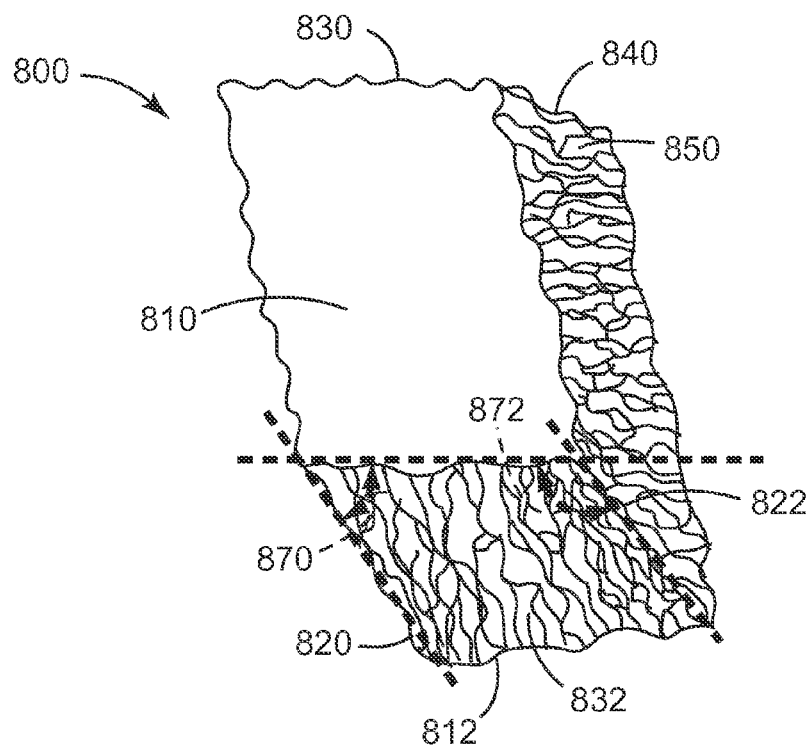
FIG. 8A is schematic perspective view of an exemplary shaped ceramic abrasive particle according to the present disclosure.

In another embodiment, methods according to the present disclosure are useful for preparing elongate shaped ceramic abrasive particles not easily preparable by other methods such as extrusion and molding. Referring now to FIG. 8A, exemplary shaped ceramic abrasive particle 800 comprises first and second opposed major surfaces 810, 812 that are connected by first and second opposed sides 820, 822 and first and second opposed ends 830, 832. First and second opposed major surfaces 810, 812 are substantially smooth (as used herein the term "substantially smooth" means generally smooth, but which may contain minor amounts of surface roughness, e.g., as resulting from imperfections and irregularities during preparation). First and second opposed sides 820, 822 and first and second opposed ends 830, 832 have a surface topography comprising tortuous rounded micrometer-scale projections 840 and depressions 850. In some embodiments, the surface topography consists of the tortuous rounded micrometer-scale projections and depressions, while in other embodiments the tortuous rounded micrometer-scale projections and depressions cover only a portion of the first and second opposed sides and first and second opposed ends. In the embodiment shown in FIG. 8A, the first side 820 abuts first major surface 810 forming an acute dihedral angle 870. Second side 822 abuts first major surface 810 forming obtuse dihedral angle 872. FIG. 18 shows an exemplary such shaped ceramic abrasive particle prepared according to Example 7. Preferably, the first and second opposed ends comprises parallel parallelograms. Preferably, the first and second opposed sides are substantially parallel.

While the foregoing shaped ceramic abrasive particles can be made according a laser cutting process according to the present disclosure, they may also be made by other techniques such as, for example, microextrusion of sol-gel ceramic precursor material. In such embodiments, the rod-shaped members may cross over one another where they meet and form the body member, and/or they may meet flush with the body member.

If desired, the cutting pattern may generate multiple shapes of ceramic precursor particles, which may be left in a combined state or which may be separated by shape (for example, by sieving). In some embodiments, the laser may be directed at the layer of ceramic precursor material such that cuts are substantially perpendicular to its exposed surface. In some embodiments, the laser may be directed at the layer of ceramic precursor material such that cuts are substantially at an angle relative to its exposed surface.

Typically, the laser beam has a profile wherein power is concentrated in certain portions (for example, the beam center), although this is not necessarily a requirement, or even desirable. As a consequence, the laser cuts may resemble valleys with sloping sidewalls. In other embodiments, the beam may have a flattened, e.g., to produce perpendicular walls.

Once formed, the shaped ceramic precursor particles are optionally further dried, for example, using drying techniques as described hereinabove, prior to separating them from the carrier. The purpose of additional drying at this stage is to increase the durability of the particles and reduce the chances of cracking and/or breakage during subsequent processing. For example, the shaped ceramic precursor particles may be dried from 1 to 480 minutes, or from 120 to 400 minutes, at a temperature in a range of from 50° C. to 160° C. or at 120° C. to 150° C.

The shaped ceramic precursor particles are typically separated from the carrier prior to subsequent process steps that may include, for example, calcining, metal ion doping, and sintering. In some cases, for example, those cases in which the carrier is combustible, it may be possible to further process the carrier with shaped ceramic precursor particles still on it as it will be burned off during calcining or sintering. Methods such as, for example, vibration (including ultrasonic vibration), scraping, vacuum, or pressurized air may be useful to facilitate the separation. In some cases, the shaped ceramic precursor particles may spontaneously separate; for example, while passing around a roll.

The next step typically involves calcining the shaped ceramic precursor abrasive particles. During calcining, essentially all volatile material is removed, and various components that were present in the abrasive dispersion are transformed into metal oxides. During calcining, the shaped ceramic precursor abrasive particles are generally heated to a temperature of from 400° C. to 800° C., and maintained within this temperature range until the free water and over 90 percent by weight of any bound volatile material are removed.

In an optional next step, it may be desired to introduce a modifying additive such as an additive metal by an impregnation process. For example, a metal oxide additive, or a precursor thereof such as a soluble metal salt, can be introduced by impregnation into the pores of the calcined shaped ceramic precursor particles. Then, the impregnated particles are pre-fired again. This option is further described in U.S. Pat. No. 5,164,348 (Wood). Examples of additive metals include zirconium, magnesium, hafnium, cobalt, nickel, zinc, yttrium, praseodymium, samarium, ytterbium, neodymium, lanthanum, gadolinium, cerium, dysprosium, and erbium. The preferred modifying additive is an oxide of yttrium, magnesium, and a rare earth metal selected from praseodymium, samarium, ytterbium, neodymium, lanthanum, gadolinium, cerium, dysprosium, and erbium.

The last step in making shaped ceramic abrasive particles involves sintering the calcined, optionally impregnated, shaped ceramic precursor particles. Prior to sintering, the calcined shaped ceramic precursor particles are not completely densified, and thus lack the hardness to be used as abrasive particles. Sintering takes place by heating the calcined shaped ceramic precursor particles to a temperature of from 1000° C. to 1650° C. and maintaining them within this temperature range until substantially all of the ceramic precursor is converted to ceramic.

In the case of alumina monohydrate (or its equivalent) sintering converts to it to alpha-alumina and the porosity is reduced to less than 15 percent by volume. The length of time to which the calcined shaped ceramic precursor particles must be exposed to the sintering temperature to achieve a sufficient level of conversion depends upon various factors, but usually from five seconds to 48 hours is typical (for example, in the case of alpha-alumina). In one embodiment, the duration for the sintering step ranges from one minute to 90 minutes. Once sintered, the resultant shaped ceramic abrasive particles can have a Vickers hardness of 10 gigapascals (GPa), 16 GPa, 18 GPa, 20 GPa, or greater.

Other steps can be used to modify the described process, such as rapidly heating the material from the calcining temperature to the sintering temperature, centrifuging the dispersion of ceramic precursor particles to remove sludge, waste, and other solid particulates. Moreover, the process can be modified by combining two or more of the process steps if desired. Conventional process steps that can be used to modify the process of this disclosure are more fully described in U.S. Pat. No. 4,314,827 (Leitheiser).

The shaped ceramic abrasive particles may also have a surface coating. Surface coatings are known to improve the adhesion between abrasive grains and the binder in abrasive articles or can be used to aid in electrostatic deposition of the shaped ceramic abrasive particles. Such surface coatings are described, for example, in U.S. Pat. No. 1,910,444 (Nicholson); U.S. Pat. No. 3,041,156 (Rowse et al.); U.S. Pat. No. 4,997,461 (Markhoff-Matheny et al.); U.S. Pat. No. 5,009,675 (Kunz et al.); U.S. Pat. No. 5,011,508 (Wald et al.); U.S. Pat. No. 5,042,991 (Kunz et al.); U.S. Pat. No. 5,085,671 (Martin et al.); and U.S. Pat. No. 5,213,591 (Celikkaya et al.). Additionally, the surface coating may prevent the shaped ceramic abrasive particle from capping. Capping is the term to describe the phenomenon where metal particles from the workpiece being abraded become welded to the tops of the shaped ceramic abrasive particles. Surface coatings to perform the above functions are known to those of skill in the art.

Shaped ceramic abrasive particles made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (that is, abrasive industry specified nominal grade) include those known as the American National Standards Institute, Inc. (ANSI) standards, Federation of European Producers of Abrasive Products (FEPA) standards, and Japanese Industrial Standard (JIS) standards. As used herein, the term "nominal" means: of, being, or relating to a designated or theoretical size and/or shape that may vary from the actual.

ANSI grade designations (that is, specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS 1000, JIS 1500, JIS2500, JIS4000, JIS6000, JIS8000, and JIS10,000.

Alternatively, the shaped ceramic abrasive particles can graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the shaped ceramic abrasive particles pass through a test sieve meeting ASTM E-11 specifications for the number 18 sieve and are retained on a test sieve meeting ASTM E-11 specifications for the number 20 sieve. For example, the shaped ceramic abrasive particles may have a nominal screened grade of: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

If desired, the shaped ceramic abrasive particles and/or shaped ceramic precursor particles may be selected on the basis on non-standard size grades. For example, the shaped ceramic abrasive particles and/or shaped ceramic precursor particles may be selected to have a length (i.e., maximum dimension) in a range of from 0.001 micrometer to 26 micrometers, from 0.1 micrometer to 10 micrometers, or even from 0.5 micrometer to one micrometers; and/or have a width in a range of from 0.001 micrometer to 26 micrometers, from 0.1 micrometer to 10 micrometers, or even from 0.5 micrometer to 5 micrometers; and/or have a thickness in a range of from 0.005 micrometers to 10 micrometers, or from 0.2 micrometers to 1.2 micrometers. In some embodiments, the ceramic shaped abrasive particles may have an aspect ratio (length to thickness) of at least 2, 3, 4, 5, 6, or more. As used herein, length is the longest particle dimension, width is the maximum particle dimension perpendicular to the length, and thickness is perpendicular to length and width.

In embodiments wherein multiple shapes of the shaped ceramic abrasive particles are produced simultaneously, sieving may be useful to separate the various particle sizes and/or shapes.

Shaped ceramic abrasive particles are useful, for example, in the construction of abrasive articles, including for example, agglomerate abrasive grain, coated abrasive articles (for example, conventional make and size coated abrasive articles, slurry coated abrasive articles, and structured abrasive articles), abrasive brushes, nonwoven abrasive articles, and bonded abrasive articles such as grinding wheels, hones and whetstones.

Figure 9:
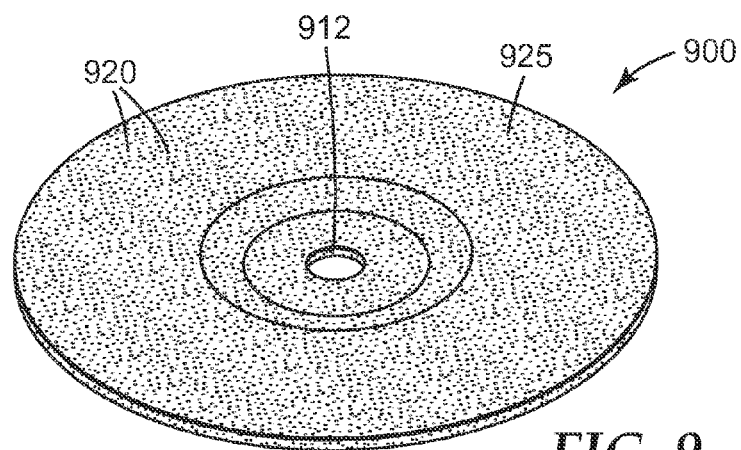
FIG. 9 is a perspective view of an exemplary bonded abrasive cut-off wheel 900 according to the present disclosure.

For example, FIG. 9 shows an exemplary embodiment of a Type 27 depressed-center grinding wheel 900 (i.e., an embodiment of a bonded abrasive article) according to one embodiment of the present disclosure. Center hole 912 is used for attaching Type 27 depressed-center grinding wheel 900 to, for example, a power driven tool. Type 27 depressed-center grinding wheel 900 comprises shaped ceramic abrasive particles 920 according to the present disclosure retained in binder 925. Examples of suitable binders include: organic binders such as epoxy binders, phenolic binders, aminoplast binders, and acrylic binders; and inorganic binders such as vitreous binders.

Figure 10:
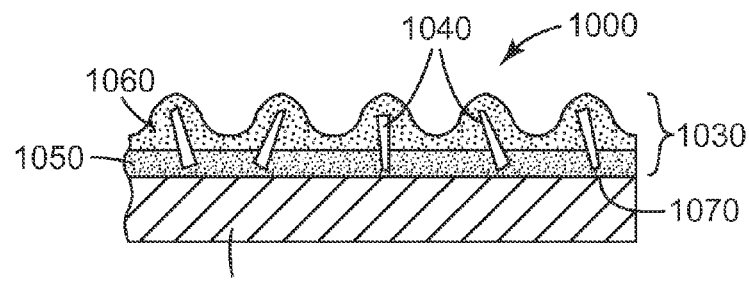
FIG. 10 is a side view of an exemplary coated abrasive article 1000 according to the present disclosure.

In one exemplary embodiment of a coated abrasive article, the abrasive coat may comprise a make coat, a size coat, and abrasive particles. Referring to FIG. 10, exemplary coated abrasive article 1000 has backing 1020 and abrasive layer 1030. Abrasive layer 1030, includes abrasive particles 1040 according to the present disclosure secured to backing 1020 by make layer 1050 and size layer 1060, each comprising a respective binder (e.g., epoxy resin, urethane resin, phenolic resin, aminoplast resin, acrylic resin) that may be the same or different.

Figure 11:
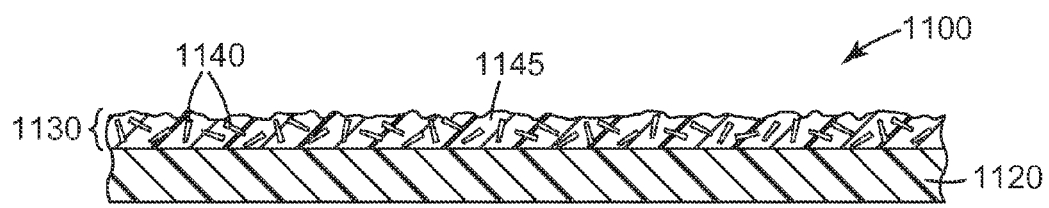
FIG. 11 is a side view of an exemplary coated abrasive article 1100 according to the present disclosure.

In another exemplary embodiment of a coated abrasive article, the abrasive coat may comprise a cured slurry of a curable binder precursor and abrasive particles according to the present disclosure. Referring to FIG. 11, exemplary coated abrasive article 1100 has backing 1120 and abrasive layer 1130. Abrasive layer 1130 includes abrasive particles 1140 and a binder 1145 (e.g., epoxy resin, urethane resin, phenolic resin, aminoplast resin, acrylic resin).

Techniques and materials for incorporating shaped ceramic abrasive particles according to the present disclosure into coated abrasive articles according to the above embodiments will be apparent to those of skill in the abrasive arts, and can be found in, for example, U.S. Pat. No. 4,314,827 (Leitheiser et al.); U.S. Pat. No. 4,652,275 (Bloecher et al.); U.S. Pat. No. 4,734,104 (Broberg); U.S. Pat. No. 4,751,137 (Tumey et al.); U.S. Pat. No. 5,137,542 (Buchanan et al.); U.S. Pat. No. 5,152,917 (Pieper et al.); U.S. Pat. No. 5,417,726 (Stout et al.); U.S. Pat. No. 5,573,619 (Benedict et al.); U.S. Pat. No. 5,942,015 (Culler et al.); and U.S. Pat. No. 6,261,682 (Law).

Figure 12A:
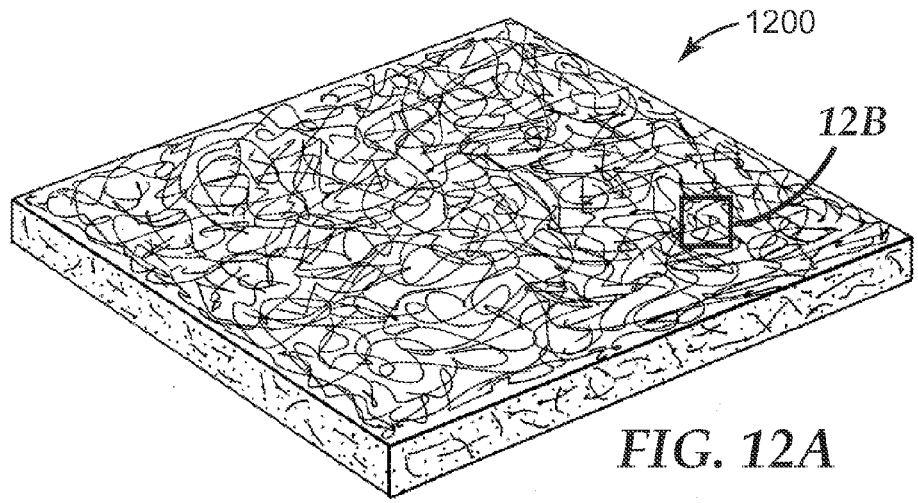
FIG. 12A is a perspective view of an exemplary nonwoven abrasive article 1200 according to the present disclosure.
Figure 12B:
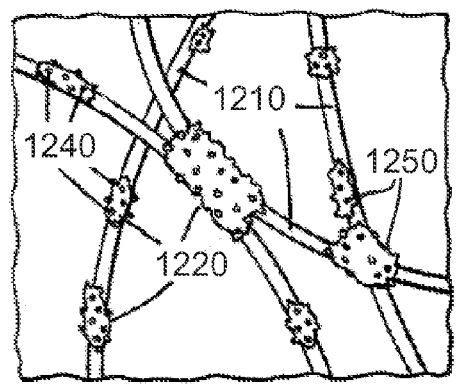
FIG. 12B is an enlarged view of region 12B in FIG. 12A.

Nonwoven abrasive articles typically include a porous (e.g., a lofty open porous) polymer filament structure having abrasive particles bonded thereto by a binder. An exemplary embodiment of a nonwoven abrasive article according to the present invention is shown in FIGS. 12A and 12B, wherein lofty open low-density fibrous web 1200 is formed of entangled filaments 1210 impregnated with binder 1220 (e.g., epoxy resin, urethane resin, phenolic resin, aminoplast resin, acrylic resin). Abrasive particles 1240 according to the present disclosure are dispersed throughout fibrous web 1200 on exposed surfaces of filaments 1210. Binder 1220 coats portions of filaments 1210 and forms globules 1250, which may encircle individual filaments or bundles of filaments, that adhere to the surface of the filament and/or collect at the intersection of contacting filaments, providing abrasive sites throughout the nonwoven abrasive article.

Techniques and materials for incorporating shaped ceramic abrasive particles according to the present disclosure into nonwoven abrasive articles according to the above embodiments will be apparent to those of skill in the abrasive arts, and can be found in, for example, U.S. Pat. No. 2,958,593 (Hoover et al.); U.S. Pat. No. 4,018,575 (Davis et al.); U.S. Pat. No. 4,227,350 (Fitzer); U.S. Pat. No. 4,331,453 (Dau et al.); U.S. Pat. No. 4,609,380 (Barnett et al.); U.S. Pat. No. 4,991,362 (Heyer et al.); U.S. Pat. No. 5,554,068 (Carr et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); U.S. Pat. No. 6,017,831 (Beardsley et al.); U.S. Pat. No. 6,207,246 (Moren et al.); and U.S. Pat. No. 6,302,930 (Lux).

Techniques and materials for incorporating shaped ceramic abrasive particles according to the present disclosure into bonded abrasive articles according to the above embodiments will be apparent to those of skill in the abrasive arts, and can be found in, for example, U.S. Pat. No. 4,800,685 (Haynes et al.); U.S. Pat. No. 4,898,597 (Hay et al.); U.S. Pat. No. 4,933,373 (Moren); and U.S. Pat. No. 5,282,875 (Wood et al.).

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades. The applied force during abrading typically ranges from about 1 kilogram to about 100 kilograms.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, and/or the like.

Examples of suitable binders include: organic binders such as epoxy binders, phenolic binders, aminoplast binders, and acrylic binders; and inorganic binders such as vitreous binders.

Select Embodiments of the Disclosure

In a first embodiment, the present disclosure provides a method comprising:

providing a layer of ceramic precursor material supported on a carrier, wherein the layer of ceramic precursor material comprises a ceramic precursor and free water; and cutting through the layer of ceramic precursor material using a laser beam to provide shaped ceramic precursor particles.

In a second embodiment, the present disclosure provides a method according to the first embodiment, wherein the method further comprises:

drying the shaped ceramic precursor particles to provide dried shaped ceramic precursor particles;

calcining the dried shaped ceramic precursor particles to provide calcined shaped ceramic precursor particles; and sintering the calcined shaped ceramic precursor particles to provide shaped ceramic abrasive particles.

In a third embodiment, the present disclosure provides a method according to the second embodiment, wherein the shaped ceramic abrasive particles comprise alpha-alumina-based shaped ceramic abrasive particles.

In a fourth embodiment, the present disclosure provides a method according to any one of the first to third embodiments, wherein the layer of ceramic precursor material is provided by partially drying a sol-gel layer.

In a fifth embodiment, the present disclosure provides a method according to any one of the first to fourth embodiments, wherein the layer of ceramic precursor material is substantially nonflowable due to gravity.

In a sixth embodiment, the present disclosure provides a method according to any one of the first to fifth embodiments, wherein the layer of ceramic precursor material has a solids content in a range of from 60 to 70 percent by weight.

In a seventh embodiment, the present disclosure provides a method according to the first embodiment, further comprising:

drying the shaped ceramic precursor particles to provide dried shaped ceramic precursor particles;

calcining the dried shaped ceramic precursor particles to provide calcined shaped ceramic precursor particles;

impregnating the calcined shaped ceramic precursor particles with an impregnating composition comprising a mixture comprising a second liquid medium and at least one of a metal oxide or precursor thereof to provide impregnated calcined shaped ceramic precursor particles, wherein the impregnating composition impregnates the calcined shaped ceramic precursor particles to a lesser degree on surfaces formed by the cutting of the laser beam than other surfaces of the calcined shaped ceramic precursor particles In an eighth embodiment, the present disclosure provides a method according to the seventh embodiment, further comprising:

sintering the impregnated calcined shaped ceramic precursor particles to provide shaped ceramic abrasive particles.

In a ninth embodiment, the present disclosure provides a method comprising:

providing a layer of ceramic precursor material supported on a carrier, wherein the layer of ceramic precursor material comprises a ceramic precursor and free water; and scoring the layer of ceramic precursor material using a laser beam to provide a scored layer of ceramic precursor material.

In a tenth embodiment, the present disclosure provides a method according to ninth embodiment, further comprising:

breaking the scored layer of ceramic precursor material along score lines to provide shaped ceramic precursor particles;

optionally calcining the shaped ceramic precursor particles to provide calcined shaped ceramic precursor particles; and sintering the calcined shaped ceramic precursor particles or the shaped ceramic precursor particles to provide shaped ceramic abrasive particles.

In an eleventh embodiment, the present disclosure provides a method according to the tenth embodiment, wherein the scored layer of ceramic precursor material is scored such that it forms a close-packed array of latent abrasive precursor particles joined to one another along score lines in the layer of ceramic precursor material.

In a twelfth embodiment, the present disclosure provides a method according to the eleventh embodiment, further comprising:

forming boundary lines in the close-packed array of latent abrasive precursor particles by cutting through the layer of ceramic precursor material using the laser beam, wherein the boundary lines separate portions of the close-packed array of latent ceramic precursor particles.

In a thirteenth embodiment, the present disclosure provides a method according to the twelfth embodiment, further comprising:

deforming the carrier such that the portions of the close-packed array of latent abrasive precursor particles break along at least some of the score lines to form the shaped ceramic precursor particles.

In a fourteenth embodiment, the present disclosure provides a method according to the ninth embodiment, further comprising:

drying the scored layer of ceramic precursor material to provide a dried scored layer of ceramic precursor material;

breaking the dried scored layer of ceramic precursor material along score lines to provide dried shaped ceramic precursor particles;

optionally calcining the dried shaped ceramic precursor particles to provide calcined shaped ceramic precursor particles; and sintering the calcined shaped ceramic precursor particles or the dried shaped ceramic precursor particles to provide shaped ceramic abrasive particles.

In a fifteenth embodiment, the present disclosure provides a method according to the fourteenth embodiment, wherein the layer of ceramic precursor material is scored such that it forms a close-packed array of latent dried ceramic precursor particles joined to one another along score lines in the layer of ceramic precursor material.

In a sixteenth embodiment, the present disclosure provides a method according to the fifteenth embodiment, further comprising:

forming boundary lines in the close-packed array of latent dried ceramic precursor particles by cutting through the layer of ceramic precursor material using the laser beam, wherein the boundary lines separate portions of the close-packed array of latent dried ceramic precursor particles.

In a seventeenth embodiment, the present disclosure provides a method according to the sixteenth embodiment, wherein said breaking the scored layer of ceramic precursor material along score lines is caused at least in part by deforming the carrier such that the portions of the close-packed array of latent ceramic precursor particles break along at least some of the score lines to form the dried shaped ceramic precursor particles.

In an eighteenth embodiment, the present disclosure provides a method according to any one of the tenth to seventeenth embodiments, wherein the shaped ceramic abrasive particles comprise alpha-alumina-based shaped ceramic abrasive particles.

In a nineteenth embodiment, the present disclosure provides a method according to any one of the ninth to eighteenth embodiments, wherein the layer of ceramic precursor material is provided by partially drying a sol-gel layer.

In a twentieth embodiment, the present disclosure provides a method according to any one of the ninth to nineteenth embodiments, wherein the layer of ceramic precursor material is substantially nonflowable due to gravity.

In a twenty-first embodiment, the present disclosure provides a method according to any one of the ninth to twentieth embodiments, wherein the layer of ceramic precursor material has a solids content in a range of from 60 to 70 percent by weight.

In a twenty-second embodiment, the present disclosure provides a method according to any one of the ninth to twenty-first embodiments, wherein the laser beam is generated by an infrared fiber laser.

In a twenty-third embodiment, the present disclosure provides a method according to any one of the ninth to twenty-second embodiments, wherein the ceramic precursor material further comprises an absorber that absorbs incident electromagnetic radiation of the laser beam and converts it into heat.

In a twenty-fourth embodiment, the present disclosure provides a method according to the twenty-third embodiment, wherein the absorber has a molar extinction coefficient at of least 10,000 M-1 cm$^{-1}$ at primary wavelengths of the laser beam.

In a twenty-fifth embodiment, the present disclosure provides a method according to the twenty-third or twenty fourth embodiment, wherein the absorber is present in sufficient amount to absorb at least 30 percent of the incident electromagnetic radiation of the laser beam.

In a twenty-sixth embodiment, the present disclosure provides shaped ceramic abrasive particles prepared according to the method of any one of the first to twenty-fifth embodiments.

In a twenty-seventh embodiment, the present disclosure provides shaped ceramic abrasive particles, wherein each of the shaped ceramic abrasive particles independently comprises a body member and at least three rod-shaped members extending from the body member.

In a twenty-eighth embodiment, the present disclosure provides shaped ceramic abrasive particles according to the twenty-seventh embodiment, wherein each one of the at least three rod-shaped members has a cross-sectional profile independently selected from a circle, an ellipse, a square, a rectangle, or a triangle.

In a twenty-ninth embodiment, the present disclosure provides shaped ceramic abrasive particles according to the twenty-seventh or twenty-eighth embodiment, wherein the at least three rod-shaped members are out of plane with the body member, and wherein the at least three rod-shaped members extend from the same side of the body member.

In a thirtieth embodiment, the present disclosure provides shaped ceramic abrasive particles according to any one of the twenty-seventh to twenty-ninth embodiments, wherein the shaped ceramic abrasive particles comprise alpha-alumina.

In a thirty-first embodiment, the present disclosure provides shaped ceramic abrasive particles according to any one of the twenty-seventh to thirtieth embodiments, wherein the body member has an opening therein.

In a thirty-second embodiment, the present disclosure provides shaped ceramic abrasive particles according to any one of the twenty-seventh to thirty-first embodiments, wherein said at least three rod-shaped members comprises first, second, third, fourth, fifth, six, seventh, and eighth rod-shaped members.

In a thirty-third embodiment, the present disclosure provides shaped ceramic abrasive particles according to any one of the twenty-seventh to thirty-second embodiments, wherein the shaped ceramic abrasive particles comprise alpha-alumina.

In a thirty-fourth embodiment, the present disclosure provides shaped ceramic abrasive particles according to any one of the twenty-seventh to thirty-third embodiments, wherein the shaped ceramic abrasive particles have a size distribution corresponding to an abrasives industry recognized nominal grade.

In a thirty-fifth embodiment, the present disclosure provides shaped ceramic abrasive particles, wherein each of the shaped ceramic abrasive particles has a body portion bounded by a peripheral loop portion having a roughened surface texture as compared to the body portion.

In a thirty-sixth embodiment, the present disclosure provides shaped ceramic abrasive particles according to the thirty-fifth embodiment, wherein the shaped ceramic abrasive particles have a size distribution corresponding to an abrasives industry recognized nominal grade.

In a thirty-seventh embodiment, the present disclosure provides shaped ceramic abrasive particles according to the thirty-fifth or thirty-sixth embodiment, wherein the shaped ceramic abrasive particles comprise alpha-alumina.

In a thirty-eighth embodiment, the present disclosure provides shaped ceramic precursor particles, wherein the shaped ceramic precursor particles have a peripheral loop portion encircling and abutting an interior portion, and wherein the peripheral loop portion comprises alpha alumina, and the interior portion comprises an alpha alumina precursor and is free of alpha alumina.

In a thirty-ninth embodiment, the present disclosure provides shaped ceramic precursor particles according to the thirty-eighth embodiment, wherein the alpha alumina precursor comprises a boehmite gel.

In a fortieth embodiment, the present disclosure provides shaped ceramic abrasive particles, wherein the shaped ceramic abrasive particles have a peripheral loop portion encircling and abutting, but not fully enclosing, an interior portion, and wherein the peripheral loop portion has a different microcrystalline structure than the interior portion.

In a forty-first embodiment, the present disclosure provides shaped ceramic abrasive particles according to the fortieth embodiment, wherein the shaped ceramic abrasive particles have a size distribution corresponding to an abrasives industry recognized nominal grade.

In a forty-second embodiment, the present disclosure provides a bonded abrasive article comprising the shaped ceramic abrasive particles according to the fortieth or forty-first embodiment retained in a binder.

In a forty-third embodiment, the present disclosure provides shaped ceramic precursor particles, wherein each of the shaped ceramic precursor particles has first and second opposed nonadjacent major surfaces, a peripheral surface extending between the first and second major surfaces, wherein the peripheral surface comprises an ablated region extending along the peripheral surface adjacent to the first major surface but not contacting the second major surface, and a fractured region extending along the peripheral surface adjacent the second major surface but not contacting the first major surface.

In a forty-fourth embodiment, the present disclosure provides shaped ceramic precursor particles according to the forty-third embodiment, wherein the fractured region has an area greater than that of the ablated region.

In a forty-fifth embodiment, the present disclosure provides shaped ceramic precursor particles according to the forty-third or forty-fourth embodiment, wherein the shaped ceramic precursor particles comprise an alpha alumina precursor.

In a forty-sixth embodiment, the present disclosure provides shaped ceramic abrasive particles, wherein each of the shaped ceramic abrasive particles has first and second opposed nonadjacent major surfaces, a peripheral surface extending between the first and second major surfaces, wherein the peripheral surface comprises an ablated region extending along the peripheral surface adjacent to the first major surface but not contacting the second major surface, and a fractured region extending along the peripheral surface adjacent the second major surface but not contacting the first major surface.

In a forty-seventh embodiment, the present disclosure provides shaped ceramic abrasive particles according to the forty-sixth embodiment, wherein the fractured region has an area greater than that of the ablated region.

In a forty-eighth embodiment, the present disclosure provides shaped ceramic abrasive particles according to the forty-sixth or forty-seventh embodiment, wherein the shaped ceramic abrasive particles comprise alpha alumina.

In a forty-ninth embodiment, the present disclosure provides shaped ceramic abrasive particles according to any one of the forty-sixth to forty-eighth embodiments, wherein the shaped ceramic abrasive particles have a size distribution corresponding to an abrasives industry recognized nominal grade.

In a fiftieth embodiment, the present disclosure provides a bonded abrasive article comprising the shaped ceramic abrasive particles of any one of the forty-ninth to fifty-second embodiments retained in a binder.

In a fifty-first embodiment, the present disclosure provides shaped ceramic abrasive particles, wherein each of the shaped ceramic abrasive particles comprises first and second opposed major surfaces that are connected by first and second opposed sides and first and second opposed ends, wherein the first and second opposed major surfaces are substantially smooth, wherein the first and second opposed sides and the first and second opposed ends have a surface topography comprising tortuous rounded micrometer-scale projections and depressions, wherein the first side abuts the first major surface forming an acute dihedral angle, and wherein the second side abuts the first major surface forming obtuse dihedral angle.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted or inappropriate, all parts, percentages, ratios, etc. in the Examples and the rest of the specification are by weight.

Comparative Example A

A boehmite gel was made by dispersing aluminum oxide monohydrate powder having the trade designation "DISPERAL" (Sasol North America of Houston, Tex.) by continuous mixing in a solution containing water and 1.86 percent nitric acid at 125° F. (52° C.). The resulting sol-gel was 40 percent by weight solids.

The resulting sol-gel was coated onto either release paper, polyester film or stainless steel substrates to form a layer of ceramic precursor material using a 6 in×6 in opening×0.030 in thick (15.24 cm×15.24 cm×0.762 mm thick) polycarbonate template and an 8-inch drywall joint knife to form a gel sheet for converting.

A pulsed $CO_2$ laser (Coherent Diamond 84 Series industrial $CO_2$ laser, Coherent Inc., Santa Clara, Calif.) was used to cut the gel sheet into equilateral triangular shapes having 110 mil (2.8 mm) sides. The laser was set to trace the triangular pattern twice at a scan speed of 1000 mm/sec, a first-pass pulse duration of 30 microseconds, a pulse frequency of 10 kHz, and a second-pass pulse duration of 20 microseconds.

Attainment of precise shapes was not possible under these conditions.

Example 1

Figure 13:
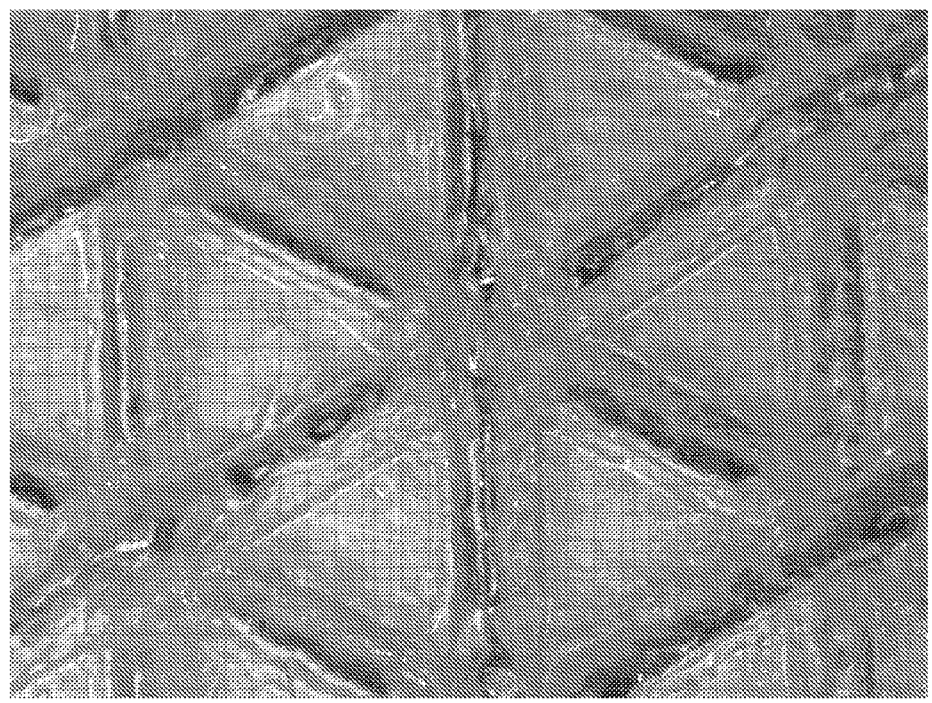
FIGS. 13 and 14 are photomicrographs showing the result of laser cutting the layer of ceramic precursor material of Examples 1 and 2, respectively.

The procedure of Comparative Example A was repeated, except that the ambient drying time of the gel sheet was increased to 30 minutes, and a stainless steel substrate was used. FIG. 13 shows the gel sheet immediately after laser cutting.

Example 2

Figure 14:
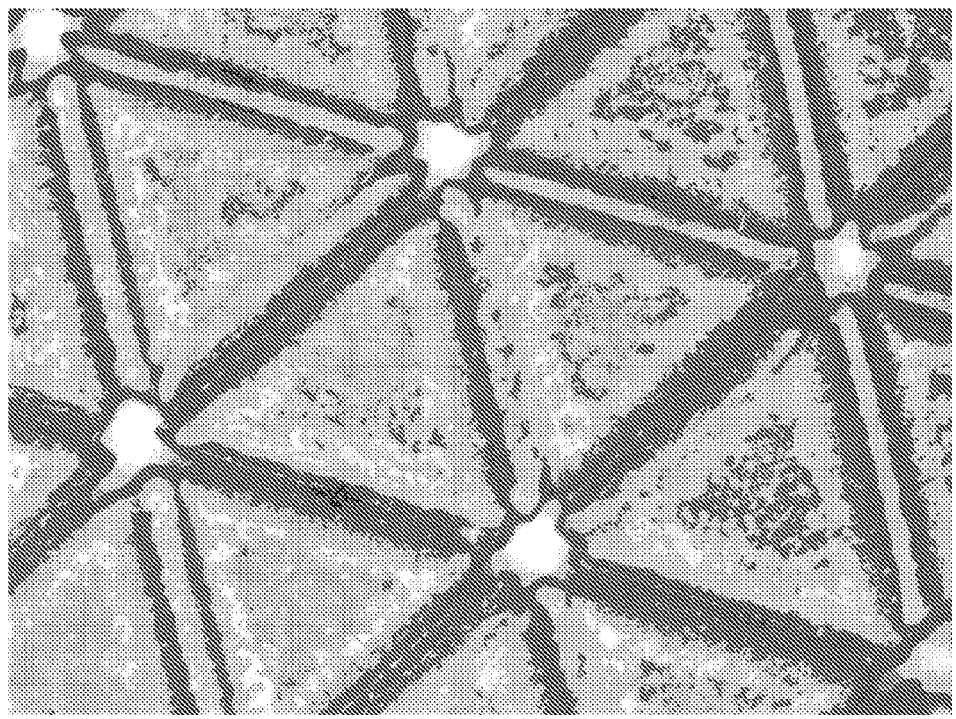

The procedure of Comparative Example A was repeated, except that the ambient drying time of the layer of ceramic precursor material was increased to 2 hours, and a polyester film substrate was used. FIG. 14 shows the gel sheet immediately after laser cutting.

Figure 15:
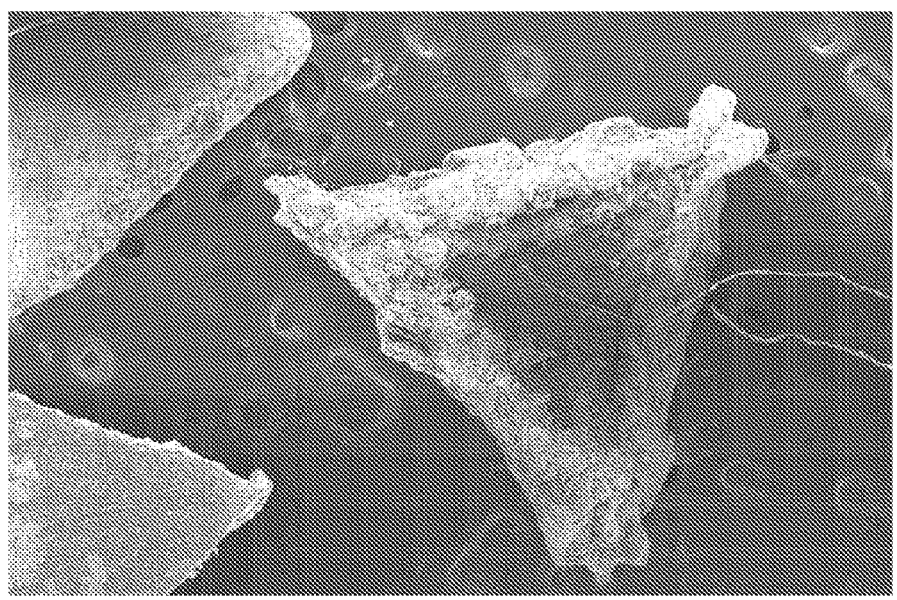
FIG. 15 is a scanning electron micrograph showing a shaped ceramic precursor abrasive particle produced in Example 2.

The particles were sintered (fired) at 1400° C. in a tube furnace. The resulting sintered particles had a true density of 3.950 $g/cm^3$ and were about 0.332 mm thick and had a side length of about 1.80 mm. FIG. 15 is an SEM photomicrograph of the sintered particles.

Example 3

Two 7-inch (18-cm) diameter×⅞-inch (2.2-cm) center hole abrasive discs including the sintered abrasive particles of Example 2 were prepared. The discs were prepared on vulcanized fiber backings using a phenolic make coating consisting of 49 parts of a 75 percent solids aqueous solution of phenol-formaldehyde resin (having a phenol:formaldehyde ratio of 1.5 to 2.1:1 catalyzed with 2.5 percent potassium hydroxide), 41 parts calcium carbonate ("HUBERCARB Q325" from J.M. Huber Corporation, Edison, N.J.), and 10 parts water. The abrasive particles of Example 2 were electrostatically coated onto the make coating and a size coating [consisting of 29 parts of a 75 percent solids aqueous solution of phenol-formaldehyde resin (having a phenol:formaldehyde ratio of 1.5 to 2.1:1 catalyzed with 2.5 percent potassium hydroxide), 51 parts filler ("CRYOLITE TYPE RTN-C" from Koppers Trading of Pittsburgh, Pa.), 2 parts iron oxide pigment, and 18 parts water] was applied. All coating weights are shown in Table 1 (below). Following curing, the discs were evaluated for abrasive performance.

TABLE 1

| DISC | PHENOLIC MAKE COAT WT (WET) | MINERAL WEIGHT | SIZE WEIGHT (WET) | DISC WEIGHT | TEST METHOD |
|---|---|---|---|---|---|
| 1 | 3.9 g | 17.2 g | 15.3 g | 58.6 g | 1 |
| 2 | 4.5 g | 17.2 | 15.5 g | 59.1 g | 2 |

Each disc was tested according to the method indicated in Table 1. Comparative Disc A was a commercially-available grade 36 fiber disc ("988C grade 36" from 3M Company of St. Paul, Minn.). A new Comparative Disc A was used for each test.

Abrasion Testing

Test Method 1—Swing Arm Test

The abrasive disc to be evaluated was attached to a 20.3 cm circular backup plate, commercially available as Part No. 05114145192 from 3M Company. The backup plate was then secured to a testing device obtained under the trade designation "SWING ARM TESTER" from Reel Manufacturing, Centerville, Minn., using a metal screw fastener. A 14-gauge (1.9 mm) 1010 steel disc-shaped work piece with a 30.5 cm diameter and 1.897 mm thickness was weighed and secured to the testing device with a metal fastener. During each test, the steel workpiece was applied to the abrasive article disc with a load of 2910 grams. The abrasive article disc was rotated at 3500 revolutions per minute (rpm), and the workpiece was placed against the disc at an angle of 18.5 degrees for up to 8 one-minute intervals, while the workpiece was rotated at 2 rpm. The test endpoint was determined when the incremental cut fell below 40 percent of the initial cut. The amount of steel removed (total swing-arm cut) was recorded.

Test Method 2—Slide Action Test

The abrasive disc to be evaluated was used to grind the face of a 1.25 cm by 18 cm 1018 mild steel workpiece. The grinder used was a constant load hydraulic disc grinder. A constant load between each workpiece and abrasive disc was maintained at 7.26 kg (16 pounds) force. The back-up pad for the grinder was an aluminum back-up pad. The disc was secured to the aluminum pad by a retaining nut and was driven at 5000 rpm. During operation, the test disc was tilted ("heeled") at approximately 7 degrees to present an abrasive band extending from the edge and in 3.5 cm towards the center to the workpiece. During testing, the workpiece was traversed along its length at a rate of about 8.4 cm per second. Each disc was used to grind a separate workpiece for successive 60-second intervals. Cut was determined for additional 60-second grinding intervals until an endpoint was reached. The endpoint was determined when cut during a one-minute test interval fell below 70 percent of the cut of the initial test interval or when the disc integrity was compromised. The test results are reported in Table 2 (below).

TABLE 2

| SPECIMEN | TEST METHOD | CUT, grams | TIME TO END-OF-TEST, minutes |
| --- | --- | --- | --- |
| Disc 1 | 1 | 382.5 | 5 |
| Comp. Disc A | 1 | 155.3 | 3 |
| Disc 2 | 2 | 3387.5 | 30 |
| Comp. Disc A | 2 | 959.5 | 10 |

Example 4

A boehmite gel was made by dispersing aluminum oxide monohydrate powder having the trade designation "DISPERAL" (Sasol North America, Houston, Tex.) by continuous mixing in a solution containing water and 1.86 percent nitric acid at 125° F. (52° C.). The resulting sol-gel was 40 percent by weight solids.

Sheets (100 mm×150 mm×1.5 mm thick) of the resulting sol-gel were cast onto sheet metal that was covered with Cut-Right wax paper from Reynolds Kitchens of Richmond, Va. using an acrylic knife (3.09 mm thickness×44.57 mm width×300 mm length) into a polycarbonate template that was 1.5 mm thick with a 100 mm wide×150 mm long.

Figure 16:
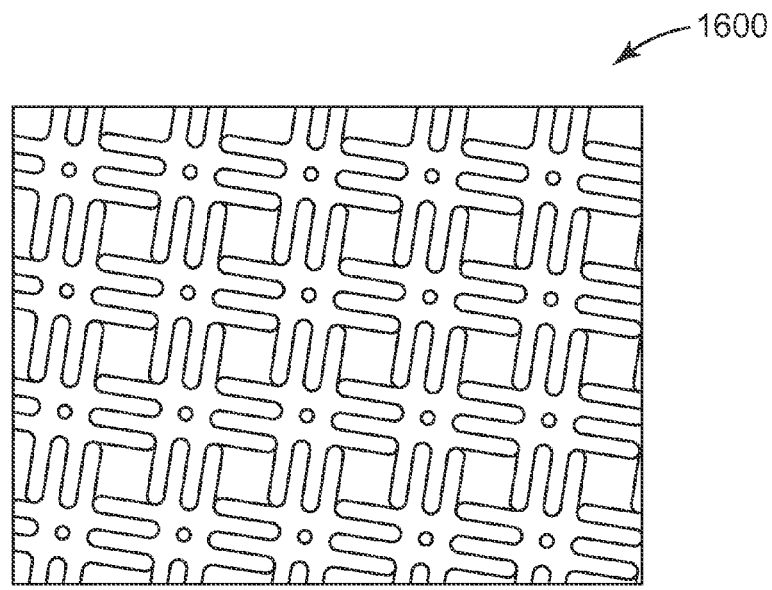
FIG. 16 is a schematic plan view of the beam trace pattern used by the cutting laser in Example 4.

Within 5 minutes of casting, the sheets were covered with a piece of 20-lb (9.1-kg) copy paper. The assembly was then allowed to dry at ambient conditions for 1-2 hours, allowing the gel to dry until it had a solids content of about 70 percent by weight. The gel sheet was cut using a Coherent DIAMOND E-SERIES 400 pulsed $CO_2$ laser from Coherent, Inc. of Santa Clara, Calif., using Nutfield WAVERUNNER software and PIPELINE controller (from Nutfield Technology of Hudson, N.H.), set to 50 kHz, 10 percent duty cycle (2 µS), to give 48.8 watts of power and a scan rate of 1 m/s with delays set at 4 ms Jump, 1 ms mark, 0.4 ms ply, 1.2 ms laser on, 1.5 ms laser off with a jump rate of 7 m/s using a nested "tic-tac-toe" pattern (shown as pattern 1600 in FIG. 16, wherein the maximum dimension was 6.67 mm) using a power of 48.8 watts and a scan rate of one meter per second (1 m/s). The cut sheets were dried at 69° F. (21° C.) for 3 days.

The cut shapes were then liberated from the sheet, and the resulting separated dried shaped ceramic precursor particles were then calcined at approximately 650° C., and then saturated with a mixed nitrate solution containing 1.4 percent as MgO, 1.7 percent as $Y_2O_3$, 5.7 percent as $La_2O_3$, and 0.07 percent as CoO impregnated at a level 70 percent by weight based on the weight of calcined gel. Once the calcined shaped ceramic precursor particles were impregnated, the particles were allowed to dry after which the particles were again calcined at 650 degrees Celsius and sintered at approximately 1400° C. Both the calcining and sintering were performed using box furnaces. A representative resulting shaped ceramic abrasive particle is shown at two magnifications in FIGS. 7A and 7B.

Example 5

TETRAARYLDIAMINE (IR dye, product code FHI 104422P, from Fabric Color Holding Company, Paterson, N.J.) was mixed at 0.08 percent by weight with boehmite sol gel prepared as in Comparative Example A. The resultant modified sol gel was coated on a flat polyethylene terephthalate polyester film with thickness 50 mil (1.27 mm). The resultant layer was cut using an 20-watt pulsed fiber laser from SPI Lasers, Southampton, United Kingdom. The laser wavelength was 1.06 micrometers. Waveform #1 was used. The laser pulse repetition rate selected was 65 kHz. At full power (100 percent), the laser output (average power) was measured 12.8 watts. The laser was directed using a HURRYSCAN 14 laser scanner from Scanlab AG, Munich, Germany, equipped with a telecentric lens having a focal length of 163 mm. The focused spot size on the layer of sol gel was estimated to be about 10 micrometers. The laser was vertically incident to the sol gel sheet surface. Parallel lines were cut in three directions with 60 degree with respect to each other, resulting in an array of close packed triangular shaped ceramic precursor particles. The laser power was set at 95 percent (12.1 W power). The line spacing was 259 micrometers, and the laser traverse speed was 300 mm/sec. A representative particle (shown in FIG. 4) was removed from the cut sol gel sheet and examined via SEM. The top edge (facing the laser) showed artifacts of ablation, and the bottom portion of particle edge was fractured.

Example 6

Figure 17A:
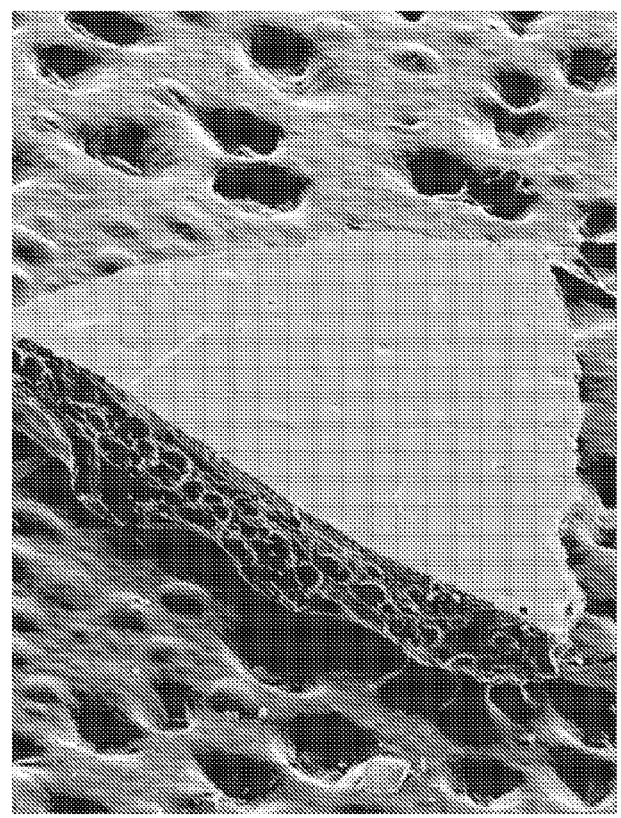
FIGS. 17A-17C are scanning electron micrographs of various particles generated in Example 6.
Figure 17B:
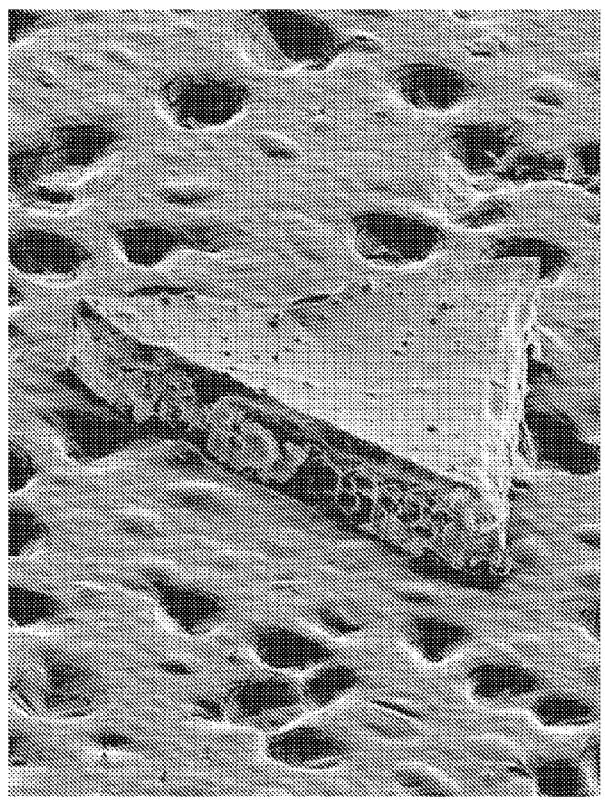
Figure 17C:
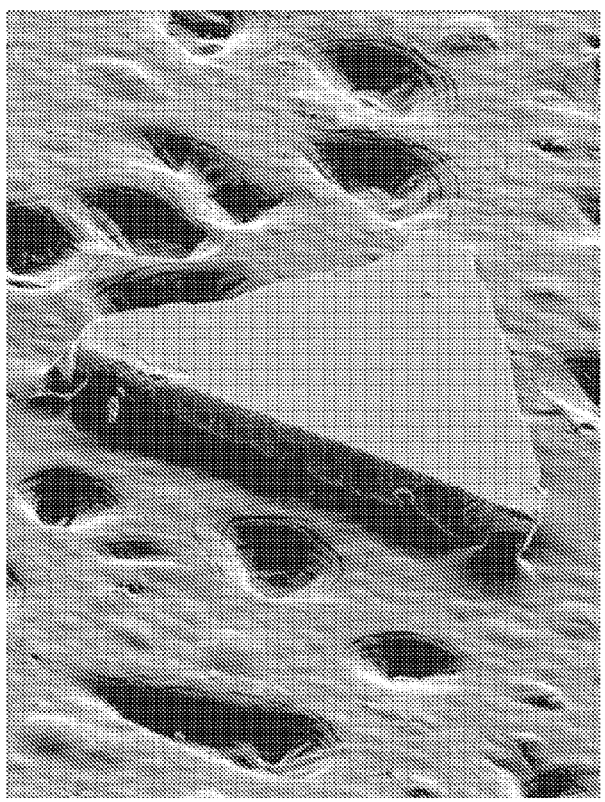

TETRAARYLDIAMINE (IR dye, product code FHI 104422P, from Fabric Color Holding Company, Paterson, N.J.) was mixed at 0.13 percent by weight with boehmite sol gel prepared as in Comparative Example A, and a high speed mixer was used to stir the solution for 10 minutes. The resulting 0.25 percent by weight dye-doped solution was green in color. The doped sol gel was aged in a plastic bottle for one hour before coating. A three-inch (8-cm) wide square applicator with 50 mils (1.27 mm) coating slot was placed on a 5 in×10 in×5 mil (12.7 cm×25.4×127 micrometer) sheet of polyethylene terephthalate (PET) film. Thirty (30) grams of the doped solution was placed into the middle of the applicator and applied to the sheet of PET film resulting in a 50 mil (1.27 mm) layer of sol gel coating on the surface of the PET sheet. The sol gel coating was left to dry at room conditions for 15 minutes. The resultant layer was cut using an 20-watt pulsed fiber laser from SPI Lasers. The laser wavelength was 1.07+/-0.01 micrometers. Waveform #0 was used. The laser pulse repetition rate selected was 30 kHz. At 90 percent power, the laser output (average power) was measured 12.8 watts. The laser pulse width was measured around 200 nanoseconds (nsec). The laser was directed using a HURRYSCAN 14 laser scanner from Scanlab AG, Munich, Germany, equipped with a telecentric lens having a focal length of 163 mm. The focused spot size on the layer of sol gel was estimated to be about 10 micrometers. The laser was vertically incident to the sol gel sheet surface. Parallel lines were cut in three directions with 60 degree with respect to each other, resulting in an array of close packed triangular shaped ceramic precursor particles. The line spacing was 93.5 mil (2.37 mm). The laser traverse speed was 1000 mm/sec. FIG. 17A shows an exemplary resulting shaped ceramic precursor particle from the above procedure. FIG. 17B shows an exemplary resulting shaped ceramic precursor particle from the above procedure after subsequent sintering. FIG. 17C shows an exemplary resulting shaped ceramic precursor particle from the above procedure after subsequent calcining and sintering.

Example 7

TETRAARYLDIAMINE (IR dye, product code FHI 104422P, from Fabric Color Holding Company, Paterson, N.J.) was mixed at 0.24 percent by weight with boehmite sol gel prepared as in Comparative Example A, and a high speed mixer is used to stir the solution for 10 minutes. A three-inch (8-cm) width of square applicator with 50 mils coating slot was placed on a 5 in×10 in×5 mil (12.7 cm×25.4×127 micrometer) sheet of polyethylene terephthalate (PET) film. Dye-doped solution was placed into the middle of the applicator and applied to the sheet of PET film resulting in a 50 mil (1.27 mm) layer of sol gel coating on the surface of the PET sheet. Sol-gel coating will be left to dry for 3 hours (from 10:19 am to 1:19 pm) under normal room condition before laser cutting experiment. The resultant layer was cut using an 40-watt pulsed fiber laser from SPI Lasers. The laser wavelength was 1.07+/−0.01 micrometers. Waveform #2 was used. The laser pulse repetition rate selected was 76 kHz. At 100 percent power, the laser output (average power) was measured 40.3 watts. The laser pulse width was measured around 60 nsec. The laser was directed using a HURRYSCAN 25 laser scanner from Scanlab AG, Munich, Germany. The focused spot size on the layer of sol gel was estimated to be about 10 micrometers.

Figure 8B:
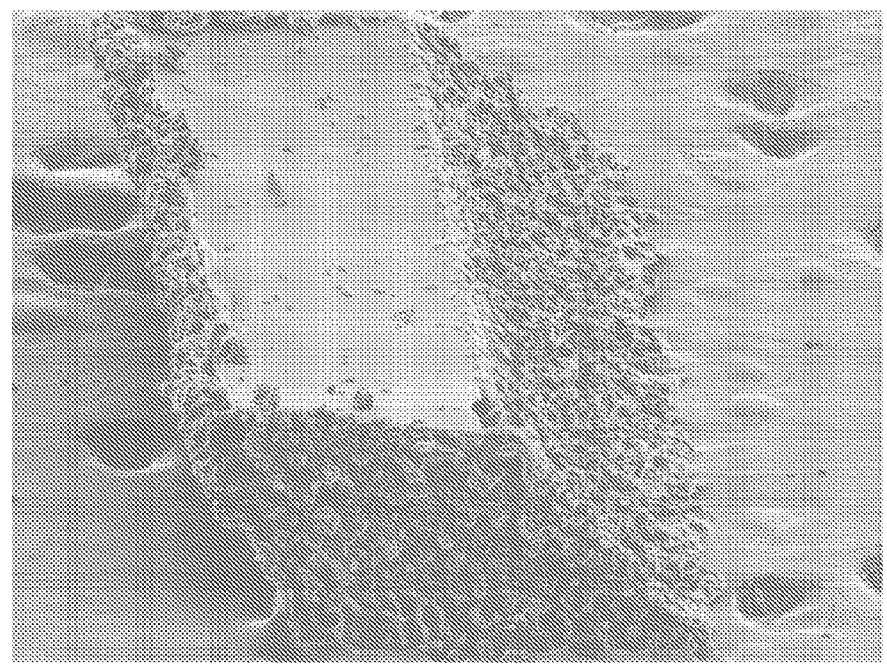
FIG. 8B is a scanning electron micrograph of an exemplary shaped ceramic abrasive particle according to the embodiment shown in FIG. 8A.

In order to achieve angle cut, the PET film was tilted at an angle of 45 degrees relative to the laser beam. The line spacing was 1 mm in the y direction and 10 mm in the x direction. Since the stage was tilted at 45 degrees, only portion of lines along the y direction was in focus. To cut the sol-gel layer, about 50 percent of the laser power (i.e., around 20 W average power at 76 kHz) and the laser line scan speed of 75 mm/sec was used. After laser cutting, the sample was left to dry 1 day, the grains were separated the resultant shaped ceramic precursor particle was viewed by scanning electron microscopy (SEM) and is shown in FIG. 8B.

Example 8

TETRAARYLDIAMINE (IR dye, product code FHI 104422P, from Fabric Color Holding Company, Paterson, N.J.) was mixed at 0.08 percent by weight with boehmite sol gel prepared as in Comparative Example A. The resultant modified sol gel was coated on a flat polyethylene terephthalate polyester film with thickness 10 mils. The resultant layer was cut using an 20-watt pulsed fiber laser from SPI Lasers. The laser wavelength was 1.06 micrometers. Waveform #1 was used. The laser pulse repetition rate selected was 65 kHz. At full power (100 percent), the laser output (average power) was measured 12.8 watts. The laser was directed using a HURRYSCAN 14 laser scanner from Scanlab AG equipped with a telecentric lens having a focal length of 163 mm. The focused spot size on the layer of sol gel was estimated to be about 10 micrometers. The laser was vertically incident to the sol gel sheet surface. Parallel lines were cut in three directions with 60 degree with respect to each other, resulting in an array of close packed triangular shaped ceramic precursor particles. The line spacing was 93.5 mil (2.37 mm). The laser traverse speed was 200 mm/sec.

Figure 18A:
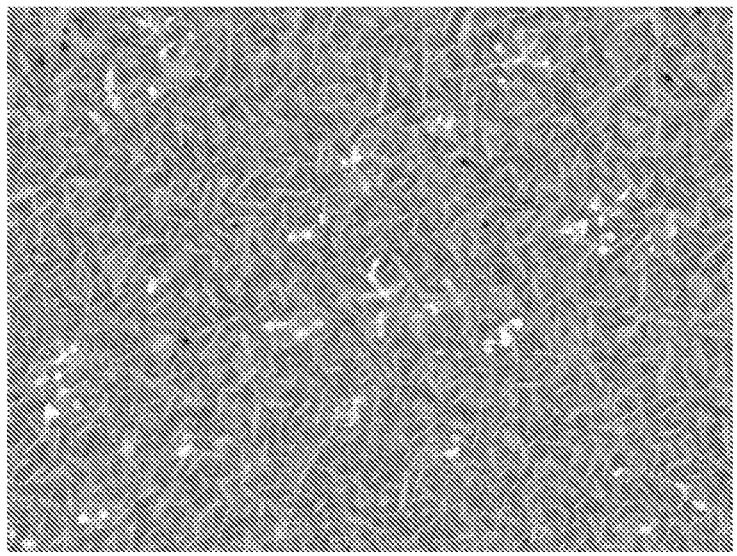
FIGS. 18A and 18B are scanning electron micrographs of a shaped ceramic abrasive particle prepared in Example 8.
Figure 18B:
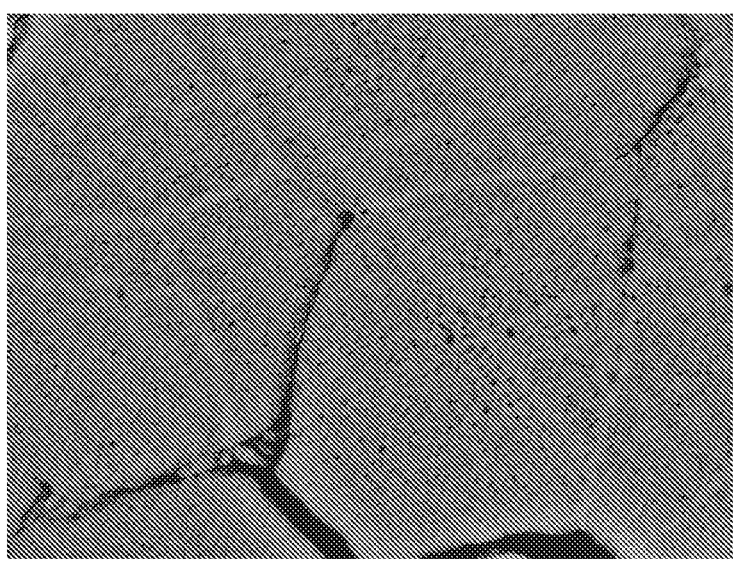

The resultant laser-cut shaped ceramic precursor particles were collected, calcined at approximately 650 degrees Celsius and then saturated with a mixed nitrate solution of the following concentration (reported as oxides): 1.8 percent each of MgO, $Y_2O_3$, $Nd_2O_3$ and $La_2O_3$. The excess nitrate solution was removed and the saturated precursor laser cut shaped abrasive particles were allowed to dry after which the particles were again calcined at 650 degrees Celsius and sintered at approximately 1400 degrees Celsius. Both the calcining and sintering was performed using a RAPID TEMP FURNACE box kiln (CM Inc., Bloomfield, N.J.). The resulting microstructure from a representative resultant shaped ceramic abrasive particle is shown in FIGS. 18A and 18B. The unique and unexpected microstructure along the laser cut edges showed no apparent evidence of the MgO, $Y_2O_3$, $Nd_2O_3$ and $La_2O_3$ dopants indicating that the laser-cut edge was converted to alpha-alumina as a result of the heat generated by laser cutting. Once fired to a dense and virtually non-porous alpha-alumina, the laser cut edges were unable to absorb the dopants. The microstructure of the laser-cut edges (e.g., see FIG. 18B) showed approximately 8- to 15-micrometer densified alpha-alumina cells believed to be produced by the extremely rapid heating of the laser cut edges. Conversely, the interior of the particle (shown in FIG. 18A) exhibit the expected microstructure resulting from absorption of the MgO, $Y_2O_3$, $Nd_2O_3$ and $La_2O_3$ dopants into the porous alpha-alumina precursor and when sintered produced the platelet structures formed within the surrounding alpha-alumina matrix.

Example 9 and Comparative Examples B-C

Example 9 and Comparative Examples B-C demonstrate the relative abrading effectiveness over time for the inventive abrasive particles compared to those of precision-molded abrasive particles and prior art abrasive particles.

Example 9

Preparation of Abrasive Particles
A boehmite gel was made by dispersing aluminum oxide monohydrate powder having the trade designation "DISPERAL" (from Sasol North America) by continuous mixing in a solution containing water and 1.86 percent nitric acid at 125° F. (52° C.). The resulting sol-gel was 40 percent by weight solids.
Sheets (100 mm×150 mm×1.5 mm thick) of the resulting sol-gel were cast onto sheet metal that was covered with CUT-RIGHT wax paper from Reynolds Kitchens, Richmond, Va. using an acrylic knife (3.09 mm thickness×44.57 mm width×300 mm length) into a polycarbonate template that was 1.5 mm thick with a 100 mm wide×150 mm long. The cast sheets were allowed to dry at ambient conditions for 30 minutes.

The resultant gel sheets were cut using a Coherent DIAMOND E-SERIES 400 pulsed $CO_2$ laser from Coherent, Inc., Santa Clara, Calif., using Nutfield WAVERUNNER software and PIPELINE controller (from Nutfield Technology), set to 50 kHz, 8 percent duty cycle (1.5 μs), to give 25 watts of power and a scan rate of 500 mm/s with a spot size of 220 μm. The scan grid was 1000 mm×1000 mm and the scanned pattern was triangles of dimensions 2.77 mm×2.77 mm×2.77 mm×0.77 mm thick. The cut sheets were air dried at ambient conditions. The cut shapes were then liberated from the sheet, and the resulting separated dried shaped ceramic precursor particles were then calcined at approximately 650° C., and then saturated with a mixed nitrate solution containing 1.4 percent as MgO, 1.7 percent as $Y_2O_3$, 5.7 percent as $La_2O_3$ and 0.07 percent as CoO impregnated at a level 70 percent by weight based on the weight of calcined gel. Once the calcined shaped ceramic precursor particles were impregnated, the particles were allowed to dry after which the particles were again calcined at 650 degrees Celsius and sintered at approximately 1400° C. Both the calcining and sintering were performed using box furnaces. The resulting triangular-shaped particles were similar in dimensions to the particles of Comparative Example B.

Preparation of Coated Abrasive Discs

A precut vulcanized fiber (obtained under the trade designation "DYNOS VULCANIZED FIBRE" from DYNOS GmbH, Troisdorf, Germany) disc blank with a diameter of 7 inches (17.8 cm), having a center hole of ⅞ inch (2.2 cm) diameter and a thickness of 0.83 mm (33 mils) was used as the abrasive substrate. The fiber disc was coated by brush with a phenolic make resin (which was prepared by mixing 49.2 parts by weight of a base-catalyzed (2.5 percent KOH) 1.5:1 to 2.1:1 phenol-formaldehyde condensate (75 percent in water), 40.6 parts by weight of CACO, and 10.2 parts by weight deionized water) to a weight of 3.8+/−0.5 grams. 17.3 grams of abrasive particles was applied using an electrostatic coater. The disc was heated at 90° C. for 1 hour followed by 103° C. for 3 hours. The discs were then coated by brush with a size resin prepared by mixing 40.6 parts by weight of a base-catalyzed (2.5 percent KOH) 1.5:1 to 2.1:1 phenol-formaldehyde condensate (75 percent in water); 69.9 parts by weight of cryolite (obtained as "CRYOLITE TYPE RTN-C" from Koppers Trading, Pittsburgh, Pa.); 2.5 parts by weight of red iron oxide pigment; and 25 parts by weight deionized water. Excess size resin was removed with a dry brush until the flooded glossy appearance was reduced to a matte appearance. The size coating weight was 17.1 grams. The disc was heated for 90 minutes at 90° C., followed by 16 hours at 103° C. The cured disc was orthogonally flexed over a 1.5 inch (3.8 cm) diameter roller and allowed to equilibrate with ambient humidity for 1 week before testing. the resulting disc is Example 8.

Comparative Example B

Comparative Example B was prepared identically to Example 8 with the exceptions that 1) the abrasive particles were shaped alpha alumina abrasive particles produced from a mold having triangular shaped mold cavities of 28 mils depth (0.71 mm) and 110 mils (2.79 mm) on each side, producing triangular shaped abrasive particles approximately 1.5 mm long on each side of the larger triangular face, approximately 0.3 mm thick, having about a 98-degree included angle for the slope of the edges, approximately grade 36+, as disclosed in U.S. Pat. Appl. Publ. No. 2010/0151196 A1 (Adefris et al.); 2) make coat weight was 3.2 grams; 3) the abrasive particle coat weight was 16.9 grams; and 4) the size coat weight was 13.9 grams.

Comparative Example C

Comparative Example C was a commercially available grinding disc, obtained as "NORTON SG BLAZE F980 FIBER DISC, 7 in×⅞ in, grade 36" from Saint-Gobain Abrasives North America, Worcester, Mass.

Abrasion Testing—Test Method 3

The abrasive discs were tested using the following procedure. 7-Inch (17.8 cm) diameter abrasive discs for evaluation were attached to a rotary grinder fitted with a 7-inch (17.8 cm) ribbed disc pad face plate ("80514 EXTRA HARD RED" obtained from 3M Company). The grinder was then activated and urged against an end face of a 0.75×0.75 in (1.9×1.9 cm) pre-weighed 1045 steel bar under a load of 10 lb (4.5 kg). The resulting rotational speed of the grinder under this load and against this workpiece was 5000 rpm. The workpiece was abraded under these conditions for a total of one hundred (100) 20-second grinding intervals (cycles). Following each 20-second cycle, the workpiece was allowed to cool to room temperature and weighed to determine the cut of the abrasive operation. Test results were reported as the incremental cut for each interval and the total cut removed as shown in Table 3. For Comparative Example B and Comparative Example C, two discs were tested. The Example 8 disc showed sustained cut that was superior to that of Comparative Example C and initially achieved cut comparable to Comparative Example B.

TABLE 3

| | INCREMENTAL CUT, grams | | | | |
|---|---|---|---|---|---|
| CYCLES | EXAMPLE 8 | COMPARATIVE EXAMPLE B(1) | COMPARATIVE EXAMPLE B(2) | COMPARATIVE EXAMPLE C(1) | COMPARATIVE EXAMPLE C(2) |
| 1 | 21.42 | 21.01 | 20.87 | 16.45 | 15.46 |
| 2 | 21.68 | 22.83 | 22.31 | 14.82 | 14.03 |
| 3 | 20.69 | 23.54 | 23.63 | 14.45 | 13.81 |
| 4 | 19.96 | 23.64 | 25.83 | 14.77 | 13.42 |
| 5 | 20.14 | 25.15 | 26.70 | 14.64 | 13.25 |
| 6 | 20.63 | 26.28 | 26.78 | 14.58 | 12.92 |
| 7 | 20.37 | 26.89 | 26.91 | 13.99 | 12.59 |
| 8 | 19.27 | 27.89 | 26.85 | 14.29 | 12.59 |
| 9 | 19.4 | 27.25 | 26.31 | 14.05 | 12.56 |
| 10 | 19.25 | 26.94 | 26.33 | 14 | 12.76 |
| 11 | 20.01 | 26.46 | 26.04 | 13.88 | 12.76 |
| 12 | 19.66 | 27.37 | 25.57 | 14.28 | 12.58 |
| 13 | 19.69 | 27.41 | 25.91 | 14.55 | 12.92 |
| 14 | 20.17 | 27.09 | 26.15 | 14.45 | 12.89 |
| 15 | 19.65 | 26.5 | 26.31 | 14.36 | 13.19 |
| 16 | 19.21 | 27.02 | 25.34 | 13.94 | 13.34 |
| 17 | 19.15 | 27.42 | 25.31 | 14.12 | 13.42 |
| 18 | 18.83 | 27.85 | 25.96 | 14.24 | 13.78 |
| 19 | 19.03 | 27.24 | 25.97 | 14.11 | 14.05 |
| 20 | 19.81 | 27.09 | 25.7 | 14.23 | 14.28 |
| 21 | 20.45 | 27.38 | 25.16 | 14.54 | 13.59 |
| 22 | 19.87 | 27.38 | 25.45 | 14.33 | 13.31 |
| 23 | 19.83 | 27.07 | 25.08 | 14.39 | 13.52 |
| 24 | 19.49 | 26.85 | 25.12 | 14.01 | 13.55 |
| 25 | 19.44 | 27.15 | 25.03 | 13.87 | 13.47 |
| 26 | 19.04 | 27.46 | 24.97 | 13.95 | 13.79 |
| 27 | 18.65 | 27.31 | 25.12 | 13.94 | 14.02 |
| 28 | 18.45 | 26.83 | 24.85 | 13.9 | 13.99 |
| 29 | 18.35 | 26.78 | 25.11 | 14.08 | 13.85 |
| 30 | 18.36 | 26.77 | 25.22 | 14.18 | 13.46 |
| 31 | 18.29 | 27.2 | 25.31 | 14.38 | 13.52 |
| 32 | 18.26 | 26.63 | 25.48 | 13.69 | 13.37 |

TABLE 3-continued

| | INCREMENTAL CUT, grams | | | | |
|---|---|---|---|---|---|
| CYCLES | EXAMPLE 8 | COMPARATIVE EXAMPLE B(1) | COMPARATIVE EXAMPLE B(2) | COMPARATIVE EXAMPLE C(1) | COMPARATIVE EXAMPLE C(2) |
| 33 | 17.36 | 26.73 | 24.6 | 13.92 | 13.22 |
| 34 | 17.39 | 26.55 | 24.61 | 13.77 | 13.22 |
| 35 | 17.21 | 26.44 | 24.54 | 13.76 | 13.61 |
| 36 | 16.81 | 25.84 | 24.55 | 13.6 | 13.8 |
| 37 | 16.73 | 25.25 | 24.44 | 13.4 | 13.58 |
| 38 | 16.81 | 24.59 | 23.39 | 13.2 | 13.55 |
| 39 | 16.94 | 24.79 | 23.94 | 13.06 | 13.44 |
| 40 | 16.74 | 25.23 | 23.46 | 12.91 | 13.06 |
| 41 | 17.26 | 24.84 | 23.43 | 13.02 | 12.88 |
| 42 | 17.11 | 25.1 | 23.21 | 12.83 | 12.9 |
| 43 | 17.01 | 25.12 | 23.01 | 12.73 | 12.94 |
| 44 | 16.88 | 24.43 | 23.15 | 12.45 | 12.66 |
| 45 | 16.73 | 24.56 | 23.36 | 11.98 | 12.66 |
| 46 | 16.85 | 24.65 | 23.83 | 11.81 | 12.4 |
| 47 | 16.62 | 24.2 | 23.67 | 11.6 | 12.38 |
| 48 | 16.34 | 23.94 | 23.89 | 11.36 | 12.3 |
| 49 | 16.22 | 23.76 | 23.9 | 11.14 | 11.99 |
| 50 | 16.13 | 23.63 | 23.95 | 10.83 | 11.68 |
| 51 | 16.14 | 23.45 | 23.7 | 10.72 | 11.63 |
| 52 | 15.91 | 23.21 | 23.58 | 10.36 | 11.31 |
| 53 | 15.89 | 23.09 | 23.47 | 10.23 | 11.2 |
| 54 | 15.56 | 23.07 | 23.59 | 9.97 | 11.02 |
| 55 | 15.54 | 23.15 | 23.61 | 9.68 | 10.68 |
| 56 | 15.39 | 23.15 | 23.2 | 9.29 | 10.58 |
| 57 | 15.06 | 22.54 | 23.44 | 8.79 | 10.37 |
| 58 | 14.86 | 22.79 | 23.15 | 8.29 | 10.11 |
| 59 | 14.7 | 22.89 | 23.11 | 7.72 | 9.91 |
| 60 | 14.31 | 22.79 | 22.78 | 7.41 | 9.79 |
| 61 | 13.74 | 22.16 | 22.48 | 7.25 | 9.34 |
| 62 | 13.53 | 22.24 | 22.24 | 7.13 | 8.82 |
| 63 | 13.48 | 22.12 | 21.8 | 7.11 | 8.32 |
| 64 | 13.29 | 21.72 | 21.85 | 7.02 | 7.93 |
| 65 | 13.11 | 21.55 | 21.64 | 6.85 | 7.47 |
| 66 | 12.88 | 21.43 | 21.82 | 6.71 | 7.25 |
| 67 | 13 | 21.16 | 21.82 | 6.53 | 6.93 |
| 68 | 12.71 | 20.76 | 21.77 | 6.4 | 6.8 |
| 69 | 12.55 | 20.41 | 21.57 | 6.3 | 6.69 |
| 70 | 12.28 | 20.32 | 21.49 | 6.25 | 6.59 |
| 71 | 12.03 | 20.07 | 21.06 | 6.17 | 6.5 |
| 72 | 11.58 | 19.88 | 21.14 | 6.14 | 6.38 |
| 73 | 11.17 | 19.43 | 20.73 | 6.02 | 6.4 |
| 74 | 11.04 | 19.23 | 20.36 | 5.96 | 6.23 |
| 75 | 10.72 | 18.92 | 20.62 | 5.87 | 6.23 |
| 76 | 10.42 | 18.62 | 20.7 | 5.87 | 6.18 |
| 77 | 9.89 | 18.16 | 20.6 | 5.84 | 6.18 |
| 78 | 9.41 | 18.01 | 20 | 5.84 | 6.04 |
| 79 | 9.22 | 17.66 | 20 | 5.81 | 6.05 |
| 80 | 8.96 | 17.28 | 20.11 | 5.7 | 6.01 |
| 81 | 8.7 | 16.92 | 20.07 | 5.69 | 5.98 |
| 82 | 8.42 | 16.32 | 19.82 | 5.68 | 5.97 |
| 83 | 8.26 | 15.83 | 19.34 | 5.66 | 5.85 |
| 84 | 8.06 | 15.83 | 19.04 | 5.66 | 5.87 |
| 85 | 7.79 | 15.67 | 19.51 | 5.62 | 5.78 |
| 86 | 7.61 | 15.29 | 19.46 | 5.58 | 5.73 |
| 87 | 7.41 | 14.99 | 19.27 | 5.58 | 5.71 |
| 88 | 7.25 | 14.91 | 19.26 | 5.59 | 5.75 |
| 89 | 7.1 | 14.67 | 19.23 | 5.55 | 5.72 |
| 90 | 7.04 | 14.38 | 19.13 | 5.55 | 5.69 |
| 91 | 7.06 | 14.09 | 19.07 | 5.42 | 5.65 |
| 92 | 6.99 | 13.83 | 18.97 | 5.43 | 5.59 |
| 93 | 6.95 | 13.48 | 19 | 5.39 | 5.5 |
| 94 | 6.83 | 13.07 | 18.91 | 5.31 | 5.5 |
| 95 | 6.71 | 12.87 | 18.83 | 5.32 | 5.48 |
| 96 | 6.67 | 12.55 | 18.73 | 5.24 | 5.47 |
| 97 | 6.48 | 12.38 | 18.82 | 5.25 | 5.38 |
| 98 | 6.41 | 12.13 | 18.82 | 5.28 | 5.36 |
| 99 | 6.34 | 11.9 | 18.59 | 5.32 | 5.37 |
| 100 | 6.3 | 11.76 | 18.39 | 5.29 | 5.35 |
| total cut | 1054 | 2069 | 2281 | 663 | 718 |

All patents cited herein above are incorporated herein in their entirety. To the extent that any conflict in disclosure may exist, the present disclosure shall control. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method comprising:
   providing a layer of ceramic precursor material supported on a carrier, wherein the layer of ceramic precursor material comprises a ceramic precursor and free water, wherein the ceramic precursor comprises an alpha alumina precursor; and
   cutting through the layer of ceramic precursor material using a laser beam to provide shaped ceramic precursor particles;
   drying the shaped ceramic precursor particles to provide dried shaped ceramic precursor particles;
   calcining the dried shaped ceramic precursor particles to provide calcined shaped ceramic precursor particles;
   impregnating the calcined shaped ceramic precursor particles with an impregnating composition comprising a mixture comprising a second liquid medium and at least one of a metal oxide or precursor thereof to provide impregnated calcined shaped ceramic precursor particles, wherein the impregnating composition impregnates the calcined shaped ceramic precursor particles to a lesser degree on surfaces formed by the cutting of the laser beam than other surfaces of the calcined shaped ceramic precursor particles.

2. The method of claim 1, further comprising:
   sintering the impregnated calcined shaped ceramic precursor particles to provide shaped ceramic abrasive particles.

3. A method comprising:
   providing a layer of ceramic precursor material supported on a carrier, wherein the layer of ceramic precursor material comprises a ceramic precursor and free water; and
   scoring the layer of ceramic precursor material using a laser beam to provide a scored layer of ceramic precursor material;
   deforming the carrier such that the portions of the close-packed array of latent abrasive precursor particles break along at least some of the score lines to form the shaped ceramic precursor particles.

4. The method of claim 3, further comprising:
   breaking the scored layer of ceramic precursor material along score lines to provide shaped ceramic precursor particles;
   calcining the shaped ceramic precursor particles to provide calcined shaped ceramic precursor particles; and
   sintering the calcined shaped ceramic precursor particles to provide shaped ceramic abrasive particles.

5. The method of claim 4, wherein the scored layer of ceramic precursor material is scored such that it forms a close-packed array of latent abrasive precursor particles joined to one another along score lines in the layer of ceramic precursor material.

6. The method of claim 5, further comprising:
   forming boundary lines in the close-packed array of latent abrasive precursor particles by cutting through the layer of ceramic precursor material using the laser beam, wherein the boundary lines separate portions of the close-packed array of latent ceramic precursor particles.

7. The method of claim 3, further comprising:
drying the scored layer of ceramic precursor material to provide a dried scored layer of ceramic precursor material;
breaking the dried scored layer of ceramic precursor material along score lines to provide dried shaped ceramic precursor particles;
calcining the dried shaped ceramic precursor particles to provide calcined shaped ceramic precursor particles; and
sintering the calcined shaped ceramic precursor particles to provide shaped ceramic abrasive particles.

8. The method of claim 7, wherein the layer of ceramic precursor material is scored such that it forms a close-packed array of latent dried ceramic precursor particles joined to one another along score lines in the layer of ceramic precursor material.

9. The method of claim 8, further comprising:
forming boundary lines in the close-packed array of latent dried ceramic precursor particles by cutting through the layer of ceramic precursor material using the laser beam, wherein the boundary lines separate portions of the close-packed array of latent dried ceramic precursor particles.

10. The method of claim 9, wherein said breaking the scored layer of ceramic precursor material along score lines is caused at least in part by deforming the carrier such that the portions of the close-packed array of latent ceramic precursor particles break along at least some of the score lines to form the dried shaped ceramic precursor particles.

11. The method of claim 4, wherein the shaped ceramic abrasive particles comprise alpha-alumina-based shaped ceramic abrasive particles.

12. The method of claim 3, wherein the ceramic precursor material further comprises an absorber that absorbs incident electromagnetic radiation of the laser beam and converts it into heat.

* * * * *

UNITED STATES PATENT AND TRADEMARK OFFICE
CERTIFICATE OF CORRECTION

| | | |
|---|---|---|
| PATENT NO. | : 9,073,179 B2 | Page 1 of 1 |
| APPLICATION NO. | : 13/881601 | |
| DATED | : July 7, 2015 | |
| INVENTOR(S) | : Dennis Welygan | |

It is certified that error appears in the above-identified patent and that said Letters Patent is hereby corrected as shown below:

Title Page, Column 2 (Other Publications)
Line 3, Delete "abrasivernaterials" and insert -- abrasivematerials --, therefor.

Specification

Column 8
Line 36-37, Delete "calcining" and insert -- calcining. --, therefor.

Column 18
Line 13, Delete "JIS 1000, JIS 1500," and insert -- JIS1000, JIS1500, --, therefor.

Column 23
Line 7, Delete "M-1 cm$^{-1}$" and insert -- M$^{-1}$cm$^{-1}$ --, therefor.

Column 31
Line 10-24, Delete "The cut . . . Example B." and insert the same on Col. 31, Line 11, as a new paragraph.

Signed and Sealed this
Twelfth Day of April, 2016

Michelle K. Lee
*Director of the United States Patent and Trademark Office*